US010111190B2

(12) United States Patent
Pelletier et al.

(10) Patent No.: US 10,111,190 B2
(45) Date of Patent: Oct. 23, 2018

(54) LATENCY REDUCTION IN LTE SYSTEMS

(71) Applicant: IDAC HOLDINGS, INC., Wilmington, DE (US)

(72) Inventors: Ghyslain Pelletier, Montréal (CA); Paul Marinier, Brossard (CA); Diana Pani, Montréal (CA)

(73) Assignee: IDAC Holdings, Inc., Wilmington, DE (US)

(*) Notice: Subject to any disclaimer, the term of this patent is extended or adjusted under 35 U.S.C. 154(b) by 0 days.

(21) Appl. No.: 15/539,173

(22) PCT Filed: Dec. 23, 2015

(86) PCT No.: PCT/US2015/000474
§ 371 (c)(1),
(2) Date: Jun. 23, 2017

(87) PCT Pub. No.: WO2016/105570
PCT Pub. Date: Jun. 30, 2016

(65) Prior Publication Data
US 2017/0367058 A1 Dec. 21, 2017

Related U.S. Application Data

(60) Provisional application No. 62/219,981, filed on Sep. 17, 2015, provisional application No. 62/096,221, filed on Dec. 23, 2014.

(51) Int. Cl.
*H04J 3/00* (2006.01)
*H04W 56/00* (2009.01)
(Continued)

(52) U.S. Cl.
CPC ....... *H04W 56/001* (2013.01); *H04W 52/246* (2013.01); *H04W 56/0045* (2013.01);
(Continued)

(58) Field of Classification Search
CPC ............. H04W 52/246; H04W 56/001; H04W 56/0045; H04W 72/0413; H04W 72/0446; H04W 76/046; H04W 76/27
See application file for complete search history.

(56) References Cited

U.S. PATENT DOCUMENTS 6,967,936 B1  11/2005  Laroia et al.
7,336,638 B2   2/2008  Cheng et al.
(Continued)

FOREIGN PATENT DOCUMENTS

CN     101902266 A    12/2010
CN     101594672 B     2/2012
(Continued)

OTHER PUBLICATIONS

Afrin et al., "A Delay Sensitive LTE Uplink Packet Scheduler for M2M Traffic", The 5th IEEE International Workshop on Management of Emerging Networks and Services, Globecom Workshop, 2013, pp. 941-946.
(Continued)

*Primary Examiner* — Minh-Trang Nguyen
(74) *Attorney, Agent, or Firm* — Condo Roccia Koptiw LLP

(57) ABSTRACT

Systems, methods, and instrumentalities are disclosed for a wireless transmit/receive unit (WTRU) autonomously synchronizing. For example, a WTRU may be configured to receive a downlink timing synchronization. The WTRU may be configured to determine a synchronization signal. The WTRU may be configured to determine a synchronization mode. The synchronization mode may be RRC CONNECTED mode. The synchronization mode may be RRC IDLE mode. The WTRU may communicate data to the network while in an unsynchronized state in an RRC IDLE and/or an RRC CONNECTED mode. The communication of data while unsynchronized may reduce latency relative to (Continued)

one or more of a random access channel (RACH) procedure, a resource radio control (RRC) connection establishment procedure, or a data packet scheduling, for example.

16 Claims, 14 Drawing Sheets

(51) Int. Cl.
    *H04W 52/24*     (2009.01)
    *H04W 76/04*     (2009.01)
    *H04W 72/04*     (2009.01)
    *H04W 76/27*     (2018.01)
(52) U.S. Cl.
    CPC ..... *H04W 72/0446* (2013.01); *H04W 76/046* (2013.01); *H04W 76/27* (2018.02); *H04W 72/0413* (2013.01)

(56) References Cited

U.S. PATENT DOCUMENTS

| | | | |
|---|---|---|---|
| 8,107,416 | B2 | 1/2012 | Jeong et al. |
| 8,483,110 | B2 | 7/2013 | Gao |
| 8,516,420 | B1 | 8/2013 | Kariat et al. |
| 8,526,420 | B2 | 9/2013 | Weng et al. |
| 8,768,383 | B2 | 7/2014 | Park et al. |
| 9,125,208 | B2 | 9/2015 | Suzuki et al. |
| 9,167,547 | B2 | 10/2015 | Suzuki et al. |
| 2005/0002345 | A1 | 1/2005 | Pyo et al. |
| 2006/0083212 | A1 | 4/2006 | Colban et al. |
| 2006/0227783 | A1 | 10/2006 | Gross |
| 2007/0082620 | A1 | 4/2007 | Zhang et al. |
| 2010/0022250 | A1* | 1/2010 | Petrovic ............... H04J 11/0093 455/450 |
| 2011/0128928 | A1 | 6/2011 | Lin et al. |
| 2012/0281566 | A1 | 11/2012 | Pelletier et al. |
| 2013/0163537 | A1 | 6/2013 | Anderson et al. |
| 2013/0176997 | A1 | 7/2013 | Tian et al. |
| 2013/0279493 | A1 | 10/2013 | Yi et al. |
| 2013/0294424 | A1 | 11/2013 | Yi et al. |
| 2014/0064195 | A1 | 3/2014 | Li et al. |
| 2014/0092855 | A1 | 4/2014 | Ahn et al. |
| 2014/0321391 | A1 | 10/2014 | Zhang et al. |
| 2015/0009874 | A1* | 1/2015 | Edara ................ H04W 52/0225 370/311 |
| 2015/0124734 | A1 | 5/2015 | Olsson et al. |

FOREIGN PATENT DOCUMENTS

| | | |
|---|---|---|
| CN | 102624420 A | 8/2012 |
| TW | 201132198 A1 | 9/2011 |
| TW | 201334609 A1 | 8/2013 |
| WO | WO 2012/041422 A2 | 4/2012 |
| WO | WO 2013/191511 A1 | 12/2013 |
| WO | WO 2014/018333 A2 | 1/2014 |
| WO | WO 2014/019216 A1 | 2/2014 |
| WO | WO 2015/129985 A1 | 9/2015 |
| WO | WO 2015/137632 A1 | 9/2015 |

OTHER PUBLICATIONS

3rd Generation Partnership Project (3GPP), TSGR1#11(00)0306, "Uplink Synchronisation for Seamless Hard Handover", Siemens, TSG-RAN Working Group 1 Meeting #11, San Diego, U.S.A., Feb. 29-Mar. 3, 2000, 9 pages.

3rd Generation Partnership Project (3GPP), R2-153116, "Optimizations for the Idle to Connected State Transition", Nokia Networks, 3GPP TSG-RAN WG2 Meeting #91, Beijing, China, Aug. 24-28, 2015, 5 pages.

3rd Generation Partnership Project (3GPP), TS 36.211 V12.3.0, "Technical Specification Group Radio Access Network, Evolved Universal Terrestrial Radio Access (E-UTRA), Physical Channels and Modulation (Release 12)", Sep. 2014, 124 pages.

3rd Generation Partnership Project (3GPP), TS 36.212 V12.2.0, "Technical Specification Group Radio Access Network, Evolved Universal Terrestrial Radio Access (E-UTRA), Multiplexing and Channel Coding (Release 12)", Sep. 2014, 89 pages.

3rd Generation Partnership Project (3GPP), TS 36.213 V12.3.0, "Technical Specification Group Radio Access Network, Evolved Universal Terrestrial Radio Access (E-UTRA), Physical Layer Procedures (Release 12)", Sep. 2014, 212 pages.

3rd Generation Partnership Project (3GPP), TS 36.321 V12.3.0, "Technical Specification Group Radio Access Network, Evolved Universal Terrestrial Radio Access (E-UTRA), Medium Access Control (MAC) Protocol Specification (Release 12)", Sep. 2014, 57 pages.

3rd Generation Partnership Project (3GPP), TS 36.331 V12.3.0, "Technical Specification Group Radio Access Network, Evolved Universal Terrestrial Radio Access (E-UTRA), Radio Resource Control (RRC), Protocol Specification (Release 12)", Sep. 2014, 378 pages.

* cited by examiner

LATENCY REDUCTION IN LTE SYSTEMS

CROSS-REFERENCE TO RELATED APPLICATIONS

This application is the National Stage entry under 35 U.S.C. § 371 of Patent Cooperation Treaty Application PCT/US2015/000474, filed Dec. 23, 2015, which claims the benefit of U.S. Provisional Patent Application No. 62/096,221, filed on Dec. 23, 2014, and U.S. Provisional Patent Application No. 62/219,981, filed on Sep. 17, 2015, the contents of all of which being hereby incorporated by reference as if fully set-forth herein in their respective entirety, for all purposes.

BACKGROUND

Transmission latency for data in the eNB for downlink transmissions or in the WTRU for uplink transmissions may be reduced.

SUMMARY

Systems, methods, and instrumentalities are disclosed for a wireless transmit/receive unit (WTRU) autonomously synchronizing. For example, a WTRU may be configured to receive a downlink timing synchronization. The WTRU may be configured to determine a synchronization signal. The WTRU may be configured to determine a synchronization mode. The synchronization mode may be RRC CONNECTED mode. The synchronization mode may be RRC IDLE mode.

A WTRU may be configured to determine to transmit an uplink transmission request. The WTRU may be configured to determine the number of transmissions of the uplink transmission request. The WTRU may be configured to determine the success of the uplink transmission request, for example, based on the number of transmissions of the uplink transmission request.

One or more techniques for communicating data may be performed by a wireless transmit/receive unit (WTRU). Techniques may include determining, by the WTRU, that at least one of: control plane data or user plane data is available for transmission to a network. Techniques may include determining, by the WTRU, that the WTRU is in at least one of: a radio resource control (RRC) IDLE mode or a RRC CONNECTED mode. Techniques may include determining, by the WTRU, that the WTRU is in an unsynchronized state relative to the network. Techniques may include sending a transmission from the WTRU in the unsynchronized state, via a physical uplink channel to the network. The transmission may include the at least one of the control plane data or the user plane data and/or an uplink timing synchronization request. Techniques may include receiving, by the WTRU, at least one of a timing advance command (TAC) or a transmit power command (TPC) from the network in response to the transmission.

An evolved NodeB (eNB) may comprise a receiver that may be configured at least to receive a transmission from a wireless transmit/receive unit (WTRU) in an unsynchronized state relative to the eNB, via a physical uplink channel. The WTRU may be in at least one of: a radio resource control (RRC) IDLE mode or a RRC CONNECTED mode. The transmission may include at least one of control plane data or the user plane data and/or an uplink timing synchronization request. The eNB may include a processor that may be configured at least to identify the at least one of control plane data or the user plane data. The processor may be configured to identify the uplink timing synchronization request. The processor may be configured to determine at least one of a timing advance command (TAC) or a transmit power command (TPC) for the WTRU. The eNB may include a transmitter that may be configured at least to send the at least one of the TAC or TPC to the WTRU in response to the transmission.

BRIEF DESCRIPTION OF THE DRAWINGS

A more detailed understanding may be had from the following description, given by way of example in conjunction with the accompanying drawings.

DETAILED DESCRIPTION

A detailed description of illustrative embodiments will now be described with reference to the various Figures. Although this description provides a detailed example of possible implementations, it should be noted that the details are intended to be examples and in no way limit the scope of the application. As used herein, the articles "a" and "an", absent further qualification or characterization, may be understood to mean "one or more" or "at least one", for example.

Figure 1A:
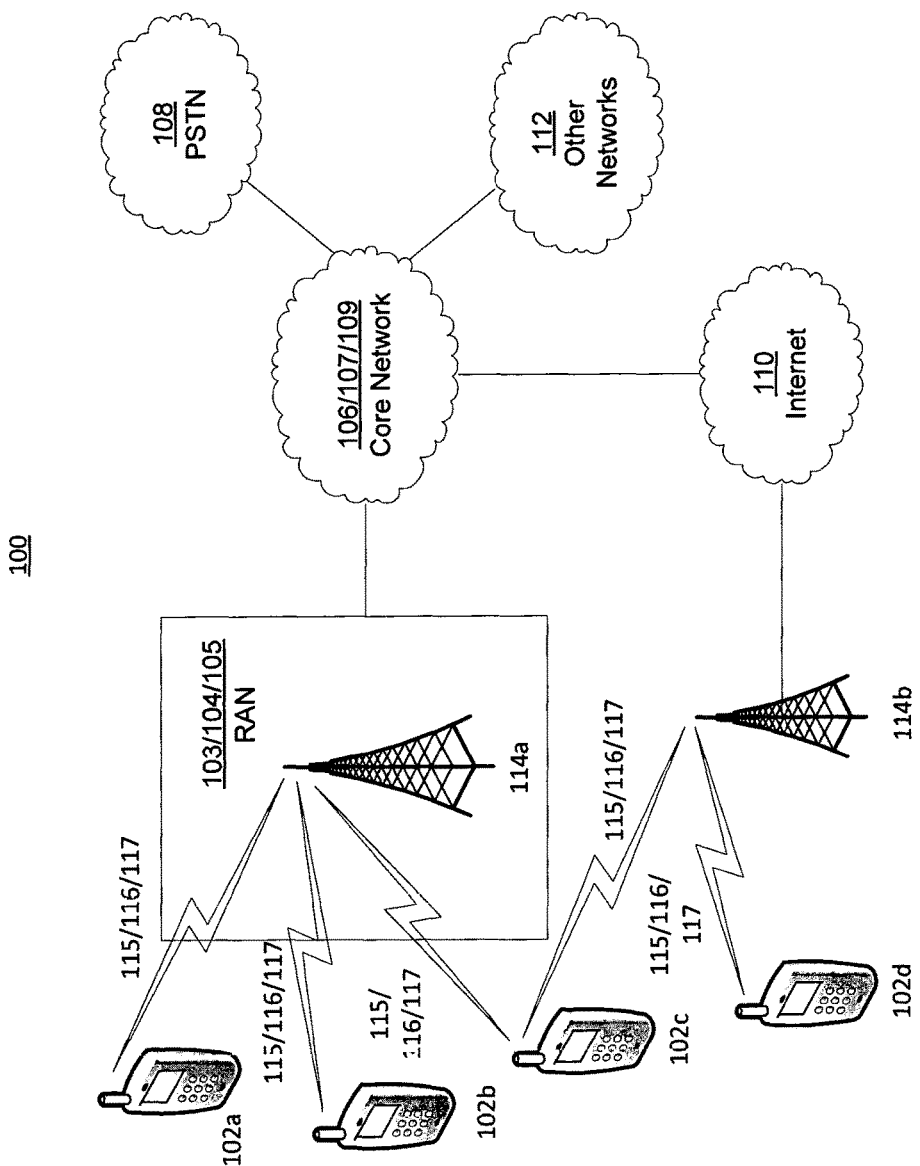
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, for example voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, for example code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include a user equipment (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, for example the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), for example a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, for example CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In an embodiment, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, for example a place of business, a home, a vehicle, a campus, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet an embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, for example user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with a RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, for example the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include a core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
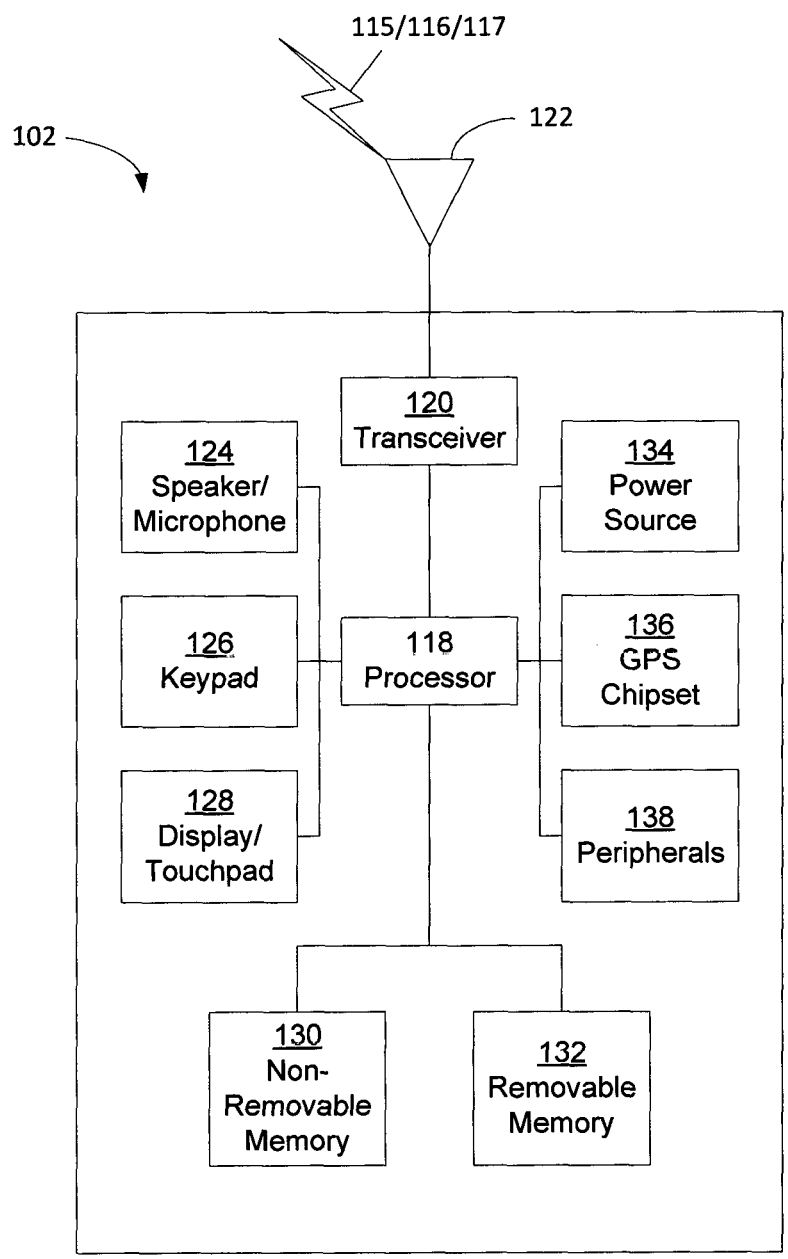
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, for example but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or each of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, for example the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, for example on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
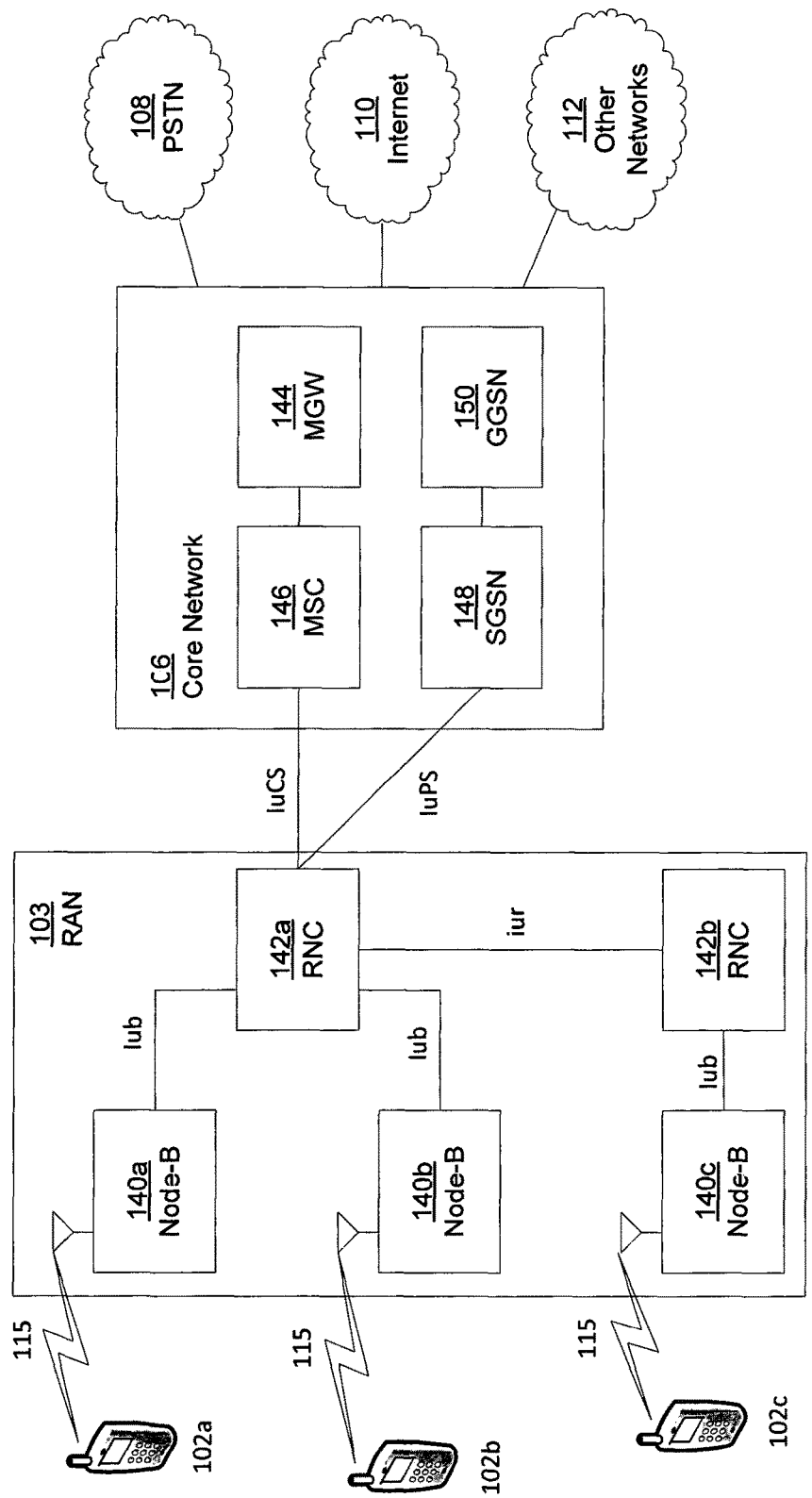
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, for example outer loop power control, load control, admission control, packet scheduling, handover control, macro diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, for example the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, for example the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
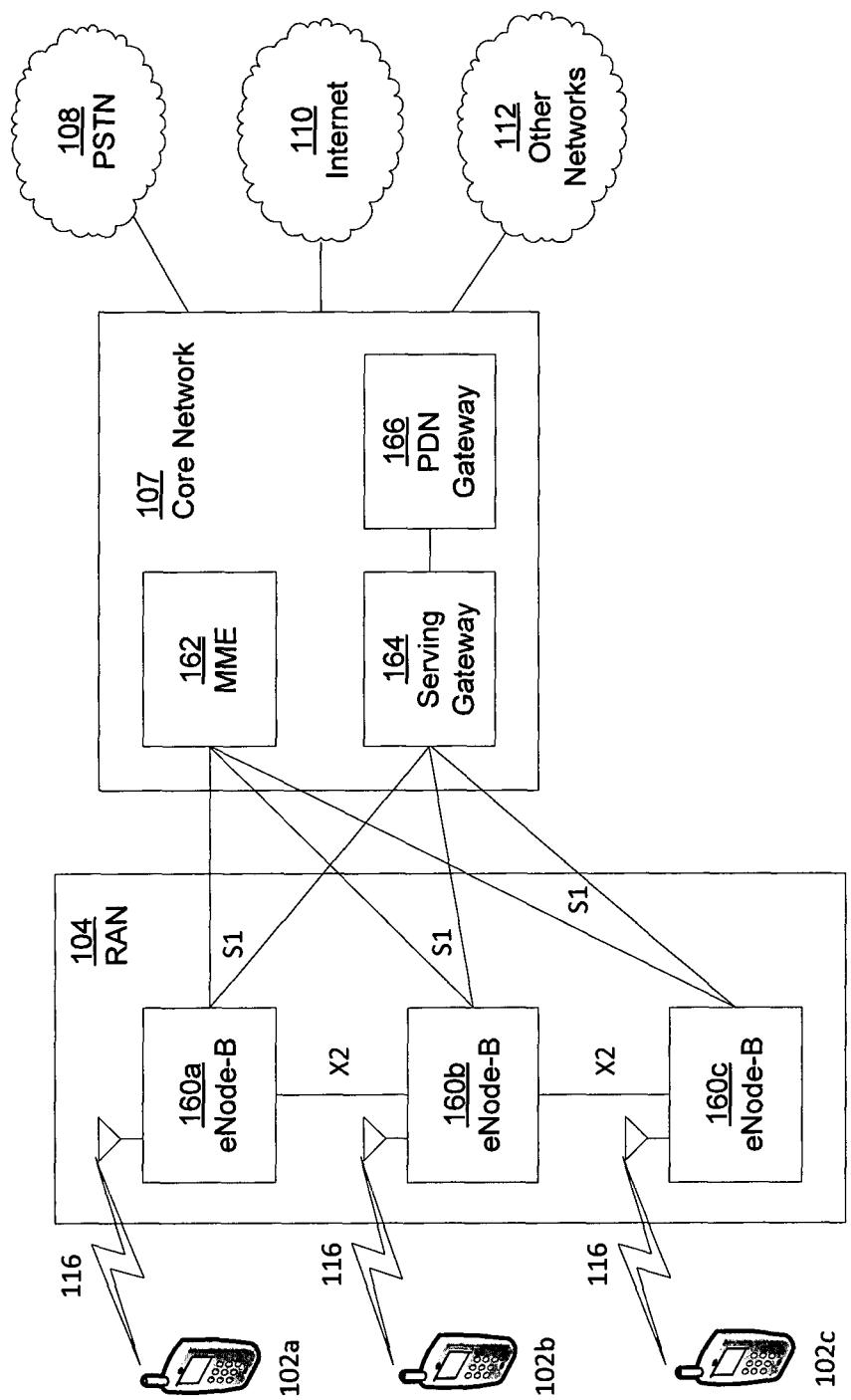
FIG. 1D is a system diagram of an example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, for example GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, for example anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, for example the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, for example the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
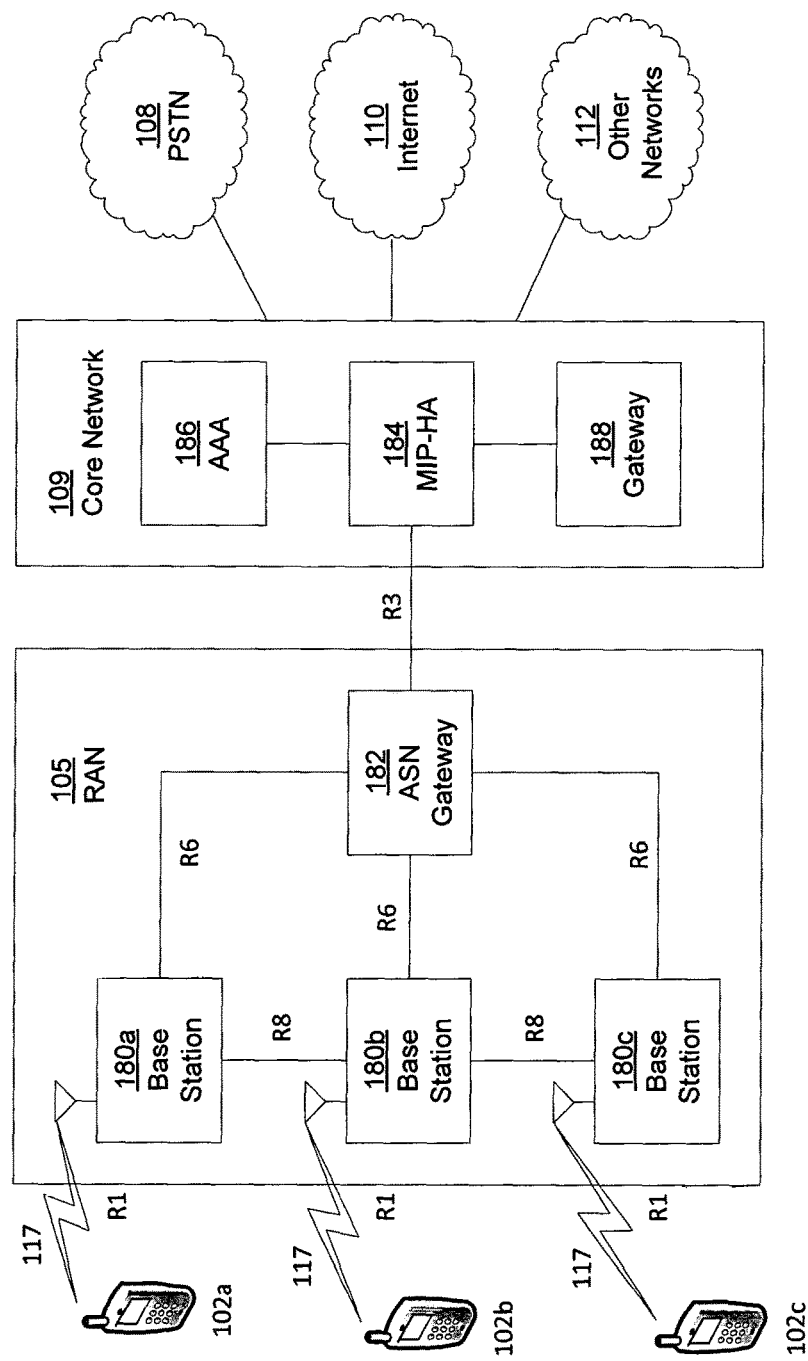
FIG. 1E is a system diagram of an example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, for example handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, for example the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, for example the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

For purposes of illustration and explanation, and not limitation, one or more of the examples described herein may refer to one or more of the following acronyms:

Δf Sub-carrier spacing
5gFlex 5G Flexible Radio Access Technology
5gNB 5GFlex NodeB
ACK Acknowledgement
BLER Block Error Rate
BTI Basic TI (in integer multiple of one or more symbol duration)
CB Contention-Based (e.g. access, channel, resource)
CoMP Coordinated Multi-Point transmission/reception
CP Cyclic Prefix
CP-OFDM Conventional OFDM (relying on cyclic prefix)
CQI Channel Quality Indicator
CN Core Network (e.g. LTE packet core)
CRC Cyclic Redundancy Check
CSI Channel State Information
D2D Device to Device transmissions (e.g. LTE Sidelink)
DCI Downlink Control Information
DL Downlink
DM-RS Demodulation Reference Signal
DRB Data Radio Bearer
EPC Evolved Packet Core
FBMC Filtered Band Multi-Carrier
FBMC/OQAM A FBMC technique using Offset Quadrature Amplitude Modulation
FDD Frequency Division Duplexing
FDM Frequency Division Multiplexing
ICC Industrial Control and Communications
ICIC Inter-Cell Interference Cancellation
IP Internet Protocol
LAA License Assisted Access
LBT Listen-Before-Talk
LCI-1 Logical Channel
LCP Logical Channel Prioritization
LTE Long Term Evolution e.g. from 3GPP LIE R8 and up
MAC Medium Access Control
NACK Negative ACK
MC MultiCarrier
MCS Modulation and Coding Scheme
MIMO Multiple Input Multiple Output
MTC Machine-Type Communications
NAS Non-Access Stratum
OFDM Orthogonal Frequency-Division Multiplexing
OOB Out-Of-Band (emissions)
OQAM Offset Quadrature Amplitude Modulation
$P_{cmax}$ Total available UE/WTRU power in a given TI
PHY Physical Layer
PRACH Physical Random Access Channel PDU Protocol Data Unit
PER Packet Error Rate
PLR Packet Loss Rate
QoS Quality of Service (from the physical layer perspective)
RAB Radio Access Bearer
RACH Random Access Channel (or procedure)
RF Radio Front end
RNTI Radio Network Identifier
RRC Radio Resource Control
RRM Radio Resource Management
RS Reference Signal
RTT Round-Trip Time
SCMA Single Carrier Multiple Access
SDU Service Data Unit
SOM Spectrum Operation Mode
SS Synchronization Signal
SRB Signalling Radio Bearer
SWG Switching Gap (in a self-contained subframe)
TB Transport Block
TDD Time-Division Duplexing
TDM Time-Division Multiplexing
TI Time Interval (in integer multiple of one or more BTI)
TTI Transmission Time Interval (in integer multiple of one or more TI)
TRx Transceiver
UFMC Universal Filtered MultiCarrier
UF-OFDM Universal Filtered OFDM
UL Uplink
V2V Vehicle to vehicle communications
V2X Vehicular communications
WLAN Wireless Local Area Networks and related technologies (IEEE 802.xx domain)

LTE R8/9 Single Cell Operation is contemplated. 3GPP LTE Release 8/9 (LTE R8/9) may support up to 100 Mbps in the downlink (DL), and 50 Mbps in the uplink (UL) for a 2×2 configuration. The LTE downlink transmission scheme may be based on an Orthogonal Frequency-Division Multiple Access (OFDMA) air interface.

For flexible deployment, LTE R8/9/10 systems may support scalable transmission bandwidths, which may be one of [1.4, 2.5, 5, 10, 15 or 20] MHz.

In LTE R8/9 (e.g., or LTE R10), one or more (e.g., each) radio frame (10 ms) may consist of 10 sub-frames of 1 ms. One or more (e.g., each) sub-frame may consist of one or more (e.g., two) timeslots of 0.5 ms each. There may be seven or six OFDM symbols per timeslot. Seven symbols per timeslot may be used with normal cyclic prefix length, and six symbols per timeslot may be used with the extended cyclic prefix length. The sub-carrier spacing for the LTE R8/9 system may be 15 kHz. A reduced sub-carrier spacing mode using 7.5 kHz may be utilized.

A resource element (RE) may correspond to one or more sub-carriers during one or more OFDM symbol intervals. Twelve sub-carriers (e.g., consecutive sub-carriers) during a 0.5 ms timeslot may constitute one resource block (RB). With seven symbols per timeslot, each RB may consists of 12*7=84 REs. A DL carrier may consist of 6 RBs to 110 RBs, for example, corresponding to an overall scalable transmission bandwidth of roughly 1 MHz to 20 MHz. Each transmission bandwidth, e.g. 1.4, 3, 5, 10 or 20 MHz, may correspond to a number of RBs.

The basic time-domain unit for dynamic scheduling may be one sub-frame consisting of two consecutive timeslots. This may be referred to as a resource-block pair. Certain sub-carriers on some OFDM symbols may be allocated to carry pilot signals in the time-frequency grid. A number of sub-carriers at the edges of the transmission bandwidth might not be transmitted, for example, in order to comply with spectral mask requirements.

In LTE R8/9 and for R10 in single carrier configuration where the network may assign the WTRU one pair of UL and DL carriers (e.g., FDD) or one carrier time shared for UL and DL (e.g., TDD), for a given subframe there may be a single Hybrid Automatic Repeat request (HARQ) process active for the UL and a single HARQ process active in the DL.

Maintenance of Uplink Timing for LTE is contemplated. In legacy LTE systems, the WTRU may apply a timing advance (e.g., using $N_{TA}$, for frame structure 1) to one or more of SRS, PUCCH and/or PUSCH transmission. For example, the WTRU may perform the uplink transmission by applying a time offset $N_{TA} \times Ts$ from the start of the corresponding downlink subframe. The WTRU may use the DL Timing Reference for one or more purposes. For example, the WTRU may use a DL timing reference to detect DL frame/subframe boundaries (e.g., based on CRS/PSS/SSS), for frame/subframe processing (e.g., timing lock). A WTRU may use a DL timing reference to determine a timing advance reference ($N_{TA\_REF}$) using one or more techniques (e.g., as described in 3GPP TS36.133). When performing preamble transmission (e.g., during a random access procedure), the WTRU may use $N_{TA\_REF}=N_{TA}=0$. The timing reference ($N_{TA\_REF}$) may be updated upon reception of a RAR TAC, and $N_{TA}$ may also be set to $N_{TA\_REF}$. The timing reference ($N_{TA\_REF}$) may be updated upon reception of a MAC TAC CE, and $N_{TA}$ may be reset to the updated value of $N_{TA\_REF}$. The DL timing reference may be used to determine the amount of WTRU-autonomous timing adjustment to apply to SRS, PUCCH and PUSCH transmissions (as adjustment to the value of $N_{TA}$ as defined by 3GPP TS36.213), in a frame for which the WTRU performs an uplink transmission and for which the WTRU does not apply a TAC. For example, when performing a transmission (e.g., the transmission after a DRX period), the WTRU may set its uplink timing ($N_{TA}$) such that the UL timing error with respect to the DL timing is, e.g., within $+/-T_e$. For example, when performing a transmission (e.g., subsequent transmissions after a DRX period, and/or if the WTRU was not in DRX), the WTRU may autonomously adjust its timing ($N_{TA}$) if the difference between the WTRU's timing and/or the timing of the frame used for applying the timing advance for the uplink transmission exceeds a certain value $T_e$.

The WTRU may perform the autonomous adjustments, described herein, for $N_{TA}$, but may, for example, ensure the adjustment amount is bounded by one or more of a maximum adjustment action, minimum adjustment rate, and/or maximum adjustment rate (e.g., as described in 3GPP TS36.133). The WTRU-autonomous timing evaluation may be performed dynamically (e.g., in the range of a few subframes) when the WTRU is synchronized and/or in DRX Active Time (if configured). Network-controlled adjustments using TAC may be somewhat slower and typically received at intervals corresponding to half the value of the configured TAT (e.g., 500 ms, 750 ms, . . . 10240 ms, infinity).

LTE R10/11 CA_Multiple Cell Operation and/or Intra-eNB Carrier Aggregation is contemplated. LTE-Advanced with Carrier Aggregation (LTE CA R10) may be an evolution to improve single carrier LTE data rates using, for example, bandwidth extensions. Bandwidth extensions may be referred to as Carrier Aggregation (CA). With CA, the WTRU may transmit and receive simultaneously over the Physical Uplink Shared Channel (PUSCH) and the Physical Downlink Shared Channel (PDSCH) of multiple serving cells. One or more (e.g., up to four) secondary serving cells (SCells) may be used in addition to a Primary serving Cell (PCell) and may support flexible bandwidth assignments up to 100 MHz. Uplink Control Information (UCI) may consist of HARQ ACK/NACK feedback and/or Channel State Information (CSI). UCI may be transmitted either on Physical Uplink Control Channel (PUCCH) resources of the PCell or on PUSCH resources available for a serving cell configured for uplink transmissions.

The control information for the scheduling of PDSCH and PUSCH may be sent on one or more Physical Data Control Channel(s) (PDCCH). In addition to the LTE R8/9 scheduling using one PDCCH for a pair of UL and DL carriers, cross-carrier scheduling may be supported by a given PDCCH, for example, allowing the network to provide PDSCH assignments and/or PUSCH grants for transmissions in other serving cell(s).

There may be one HARQ entity for one or more (e.g., each) serving cell, where one or more (e.g., each) entity may have up to 8 HARQ processes (e.g., one per subframe for one round-trip time (RTT)), for example, for a FDD LTE R10 UE/WTRU operating with CA. There may be more than one HARQ process active for the UL and for the DL in any given subframe. There may be a UL (e.g., at most one UL) and a DL HARQ process per configured serving cell.

Scheduling principles is contemplated. In LTE R8/9/10+, the PDCCH may be used by the network (e.g., NW or eNB) to assign resources for downlink transmissions on the PDSCH and/or to grant resources for uplink transmissions on the PUSCH to the terminal device (e.g., WTRU).

A WTRU may request radio resources for an uplink transmission, for example, by sending a scheduling request (SR) to the eNB. The SR may be transmitted on dedicated resources (D-SR) on the Physical Uplink Control Channel (PUCCH) if configured. The SR may be transmitted using the Random Access procedure (RACH) (e.g., RA-SR).

The eNB may grant radio resources to the WTRU for a transmission on PUSCH, for example, indicated in a grant received on the PDCCH in configured resources (e.g., a Semi-Persistently Scheduled UL grant).

The WTRU may include, for example, in an uplink transmission, a Buffer Status Report (BSR), indicating the amount of data in the WTRU's buffer. The trigger to transmit a BSR may trigger a scheduling request.

Control signalling for scheduling and PDCCH monitoring may be disclosed herein. The WTRU may determine whether or not it needs to act on control signalling in a given sub-frame, for example, by monitoring the PDCCH for specific data control information messages (DCI formats). DCI formats may be masked using a known radio network temporary identifier (RNTI) in specific locations, or search space, using different combinations of physical resources (e.g., control channel elements (CCEs)) based on aggregation levels (AL) (e.g., each corresponding to either 1, 2, 4, or 8 CCEs). A CCE may consist of 36 QPSK symbols, or 72 channel coded bits.

Scheduling control information in an uplink grant may include a New Data Indicator (NDI). An NDI may be used to determine whether the grant is for an initial transmission or for a retransmission. A resource assignment that may indicate what physical resources blocks (PRBs) in time and frequency may be allocated to the transmission and a Modulation and Coding Scheme (MCS). A WTRU may determine the size of the associated transport block (TB) from the MCS and the number of PRBs allocated to the transmission.

LTE R12+Dual Connectivity, Multiple Cell Operation, and/or Inter-eNB CA is contemplated. In LTE R12 (e.g., or later, for aspects of multi-cell operation using inter-eNB carrier aggregation), the WTRU may be configured with some form dual connectivity, such as a configuration in which the WTRU may have access to resources of cells associated to different eNBs. The network may control connectivity using a single MME/S1-c connection terminating in the MeNB.

Control plane aspects are contemplated. From the perspective of the control plane, the WTRU may have established a RRC connection with a first eNB (e.g., a MeNB) and may support a configuration where one or more cells may be associated to a second eNB (e.g., a SeNB). If it is assumed that the RRC connection terminates in the MeNB, then the complete message may be received by the RRC entity in the MeNB.

User plane aspects are contemplated. From the perspective of the user plane architecture, the network may terminate S1-u in the MeNB (e.g., in the MeNB and not the SeNB for one or more, or each, EPS bearers). The network may terminate (e.g., additionally terminate) S1-u in the SeNB (e.g. for one or more EPS bearer).

Layer 2 (L2) transport of user plane and/or control plane data are contemplated. From the perspective of the L2 transport of SRB data and/or user plane traffic, data for a given radio bearer may be transmitted from the network to the WTRU using a single L2 path or using either L2 path (hereafter referred to as DL multi-flow). Data transmitted may be transmitted from the WTRU to the network using a single L2 path or using either L2 path (e.g., UL multi-flow). Multi-flow may be realized by configuration of a bearer such that it may be mapped to different cells associated to more than one eNB.

A transport bearer function may be modeled as a combination of Quality-of-Service (QoS) related aspects and a routing function. QoS-related aspects may be parameterized in terms of (e.g., maximum or guaranteed) bit rate, maximum tolerable latency or the likes. Routing for a bearer may be achieved using some form of physical or logical point-to-point transport path (e.g., such as using a tunneling function based on GTP-u or based on an IP tunnel).

The terms primary MAC entity and Secondary MAC entity may refer to MAC entities as separate processes associated (e.g., each associated) to cells of different eNBs (e.g., a MeNB and a SeNB) and to the associated Layer 1 (L1) or physical layer processing. The terms primary MAC entity and Secondary MAC entity may refer to a single MAC entity which may make the distinction between a Uu (e.g., L1/PHY) associated to a first eNB (e.g., a MeNB) and to a second eNB (e.g. a SeNB). The WTRU may have one primary MAC entity associated to the MeNB and one secondary MAC entity associated to a SeNB.

The Primary MAC entity may correspond to the MAC entity that is configured with the PCell on which the WTRU may have established the RRC connection (e.g., as per the legacy R10 definition of the PCell). The Secondary MAC entity may be configured with a special cell, for example, in which case such cell may be configured with an uplink carrier and with additional PUCCH resources.

Latency reduction may is contemplated.

Pre-allocation of resources are contemplated. Pre-allocation may be a form of pre-scheduling that may provide the WTRU with an opportunity to send UL packets without requiring the WTRU to send a scheduling request. Pre-allocation may provide resource block grants to WTRUs, for example, in case they have something to transmit when those resource blocks are not used for actual traffic from other WTRUs. Pre-allocation may be different from other forms of pre-scheduling, such as semi-persistent scheduling. Pre-allocation may use the PDCCH to grant UL resources when not used by actual traffic. Semi-persistent scheduling may provide a regular allocation to the WTRU, for example, without repetitive scheduling on the PDCCH.

Contention-Based PUSCH is contemplated. Contention Based (CB) transmission may allow uplink synchronized WTRUs to transmit uplink data without sending Scheduling Request in advance. Dynamic assignment of uplink Resource Blocks for CB transmission may be achieved by using the Downlink Physical Control Channel (PDCCH). By using the PDCCH, CB grants may be assigned to unused resources on a per subframe basis, for example, so that scheduling of uplink CF transmissions is not affected. A static assignment of CB resources may be avoided. CB resources may be dynamically assigned, for example, depending on the uplink load.

Contention Based Radio Network Temporary Identifiers (CB-RNTI) may be introduced to identify the CB uplink grants on the PDCCH. The CB uplink grants may have the same format as for Rel-8 WTRUs, such as Resource Blocks, Modulation and Coding Scheme and Transport Format to be used for the uplink CB transmission. Rel-10 WTRUs may listen for CB uplink grants addressed to these CB-RNTIs and grants addressed to their dedicated C-RNTI. The available CB-RNTIs in a cell may be broadcasted or signaled to one or more (e.g., each) WTRU during RRC connection setup. The scheme may be backwards compatible, since pre Rel-10 WTRUs might not decode the grants addressed to CB-RNTIs.

SR-associated contention-based is contemplated. With SR associated contention based transmission, pre-allocated resource may be shared and identification of the WTRUs making use of it may be done via the D-SR. This may save latency associated to the eNB processing time between reception of D-SR and issuing a grant for a transmission.

Applicability of the different latency reduction schemes to a subset of data is contemplated. To lower the probability of collisions for schemes using a shared (e.g., or contentious) resource, the WTRU may be allowed to use such resource for transmissions associated to a subset of its radio bearers (e.g., only for transmissions associated to a subset of its radio bearers).

L1/2TTI Reduction is contemplated. From the perspective of the physical layer, latency may be reduced by shortening at least one of the following timing aspects: the Transmission Time Interval (TTI), or the HARQ Round-Trip Time (RTT).

In reduction of the Transmission Time Interval (TTI), the TTI may be reduced by shortening in time one or more types of transmissions, for example, by using one slot in the legacy subframe instead of both slots.

In reduction of the HARQ Round-Trip Time (RTT), the HARQ RTT may be reduced by adjusting timing relationship between scheduling, transmissions and associated HARQ feedback. This may reduce the processing time budget for the WTRU and for the eNB. Reduction of the HARQ Round-Trip Time (RTT) may be combined with TTI length reduction.

Enabling shorter TTIs and/or shorter HARQ RTT for at least some transmissions and/or for at least some types of transmissions may be difficult to be made backward compatible. Otherwise, this may be akin to the design of a new air interface.

L3/2 Connectivity Management is contemplated. From the perspective of L3/2 connectivity management, latency may be reduced by addressing at least some of a number of aspects, such as: RRC Connection establishment procedure (from RRC IDLE, e.g., when transitioning from IDLE); ECM-IDLE to ECM-CONNECTED; NAS Service Request (SR) procedure (from RRC IDLE, e.g., when in RRC IDLE); and/or security activation (from RRC IDLE, e.g., when transitioning from IDLE).

In RRC Connection establishment procedure (from RRC IDLE), the network may keep a WTRU in RRC Connected and/or send the WTRU to RRC IDLE when it determines that the WTRU is no longer active, for example, based on the expiration of an inactivity timer managed by the eNB. There may be a tradeoff between both approaches in terms of mobility management, signaling overhead and latency before the WTRU may become active in transmissions after a period of inactivity. This bottleneck may be addressed, for example, by enabling certain data transfers without the need for an established (e.g., or up-to-date) RRC connection and/or by establishing intermediate connectivity state in the RAN. This may be accomplished by modeling additional state(s) in the RRC protocol (e.g., an RRC-Inactive state).

In ECM-IDLE to ECM-CONNECTED, from the WTRU's perspective, the ECM state may follow the RRC state. In ECM-IDLE to ECM-CONNECTED, from the MME's perspective, the ECM state may depend on S1 connection state (e.g., one of established or released). Latency may be reduced by decoupling the MME state from the RRC state, for example, at least partially. This may be accomplished by modeling additional state(s) in the RRC protocol (e.g., an EMM-Inactive state). In such case, ensuring that the S1 connection may follow the WTRU may be difficult, for example, in case of WTRU autonomous mobility (e.g., cell reselection).

In NAS Service Request (SR) procedure (from RRC IDLE), the WTRU may send an NAS SR to establish, for example, a DEFAULT bearer and/or when a bearer with higher Quality of Service (QoS) may be utilized. This procedure may utilized the involvement from the core network and/or introduce additional latency, for example, when the WTRU performs the initial RRC Connection establishment procedure. This may be avoided, for example, by enabling means for the WTRU and the network to maintain the EPS bearer independently of the state of the associated DRB (e.g., based on the modeling of an ECM-Inactive state) and/or independently of the state of the RRC Connection (e.g., based on the modeling of an RRC-Inactive state).

In security activation (from RRC IDLE), the WTRU may have a valid security context for the lifetime of the RRC Connection. Security may be activated when the WTRU performs the initial RRC Connection Establishment procedure, for example, when moving from RRC IDLE to RRC CONNECTED state. At least parts of a security context from one RRC connection to another may be maintained or reused. Such security context may be valid beyond the RRC CONNECTED state and may continue in a different RRC state (e.g., based on the modeling of an RRC-Inactive state).

PRACH Resource multiplexing is contemplated. In LTE R8/9/10+, the WTRU may initiate the RA procedure when one of the following events occurs: a connection establishment, for example, when the WTRU accesses the network to establish an RRC connection; a mobility event, when the WTRU accesses the target cell during a handover procedure; a recovery event, when the WTRU performs the RRC Connection Re-establishment procedure; a network-initiated, when instructed by the NW (e.g., by PDCCH RA order) for example, for DL data arrival; a scheduling request (RA-SR), when the WTRU has new UL data to transmit and the data is of higher priority than existing data in its buffer, and the WTRU has no D-SR.

The RA procedure may be either contention-free (CFRA) or contention-based (CBRA), for example depending on whether or not the WTRU is assigned dedicated RACH resources, either a specific preamble and/or a resource on the Physical Random Access Channel (PRACH). The RA procedure may consist of the following: MSG0 (e.g., when network initiated), comprising the DCI received on PDCCH indicates RACH may be performed; MSG1, comprising preamble transmission on a resource of the PRACH; MSG2, comprising Random Access Response (RAR) reception; MSG3, comprising transmission of message3, which may contain a BSR, signaling data and/or user-plane data; and MSG4, comprising contention resolution, such as the WTRU determining whether or not it successfully completed the RACH procedure based on either C-RNTI on PDCCH or WTRU Contention Resolution Identity on DL-SCH. The RAR may comprising an uplink grant and a Timing Advance Command (TAC);

For CBRA, in LTE, there may be a PRACH (e.g., at most one PRACH) configured for a given cell, such as there may be a single set of PRACH resources in a cell.

For FDD, a WTRU may be configured by higher layer configuration (e.g., either from reception of broadcasted System Information or from reception of dedicated signaling) a PRACH (e.g., with at most one PRACH) for any given subframe that may be configured with available PRACH resources.

For TDD, due to the nature of the UL/DL subframe configuration, frequency multiplexing may be used when time multiplexing may be insufficient to obtain the desired PRACH density. In this case, the WTRU may be configured by higher layer configuration (e.g., either from reception of broadcasted System Information and/or from reception of dedicated signaling) with multiple PRACH resources for one or more (e.g., each) subframe configured with available PRACH resources. One or more (e.g., each) PRACH resource may be indexed, for example, based on increasing frequency domain. In other words, when frequency multiplexing is used, there may be multiple (e.g., multiples of six) Physical Resource Blocks (PRBs) for PRACH availability in the given subframe, where on or more (e.g., each) group (e.g., group of six) PRBs represents a single PRACH opportunity.

The WTRU may transmit a preamble on a configured uplink resource for PRACH, for example, if such resource is available in the given subframe, such as when the WTRU performs the random access procedure. One or more (e.g., each) random access preamble may occupy a bandwidth corresponding to one or more (e.g., six) consecutive PRBs for both FDD and TDD.

Existing PRACH resources may be partitioned (e.g. based on timing, preamble groups) and/or PRACH resources may be multiplexed (e.g. in the time domain, in the frequency domain or both in combination).

One or more design approaches for 5G systems are contemplated. One or more flexible radio accesses for 5G are contemplated. Mobile communications are in continuous evolution and is already at the doorstep of its fifth incarnation—5G. New use cases may contribute in setting the requirements for the new system. It is expected that the 5G air interface may at least enable the following use cases:

Improved broadband performance (IBB);
Industrial control and communications (ICC) and vehicular applications (V2X); and/or
Massive Machine-Type Communications (mMTC).

Theses uses cases, among others, may be translated into one or more of the requirements for the 5G interface described herein.

Support for Baseband filtering of frequency-domain waveform is contemplated. At least one design consideration may be the ability for baseband filtering of the frequency-domain waveform to enable effective aggregation of up to 150-200 MHz total spectrum, perhaps for example within a given RF transceiver path, and/or perhaps for example without relying on a re-design of the front end.

Aggregation of spectrum across widely separated operating bands (e.g. 900 MHz and 3.5 GHz) may still use multiple RF transceiver chains, perhaps for example because of antenna size requirements and/or amplifier optimization design constraints. A WTRU/UE implementation may include up to three or more separate RF transceiver paths, for example: a first one below 1 GHz, a second one for the 1.8-3.5 GHz frequency range, and/or a third one covering the 4-6 GHz frequency range.

Native built-in support for Massive MIMO antenna configurations may be a second order requirement.

It may be useful for at least IBB that multiple frequency bands with spectrum of varying sizes be efficiently aggregated, perhaps for example to achieve data rates in the order of several tens of Mbps (e.g., cell edge) up to peak data rates of several Gbps (e.g. up to 8 Gbps) with typical rates perhaps for example in the order of several hundreds of Mbps.

Support for ultra-low transmission latency is contemplated. Air interface latency as low as 1 ms RTT may use support for TTIs, for example somewhere between 100 us and 250 us (perhaps for example no larger than 250 us).

Support for ultra-low access latency (e.g. time from initial system access until the completion of the transmission of the first user plane data unit) is contemplated.

It may be useful for at least ICC and/or V2X to experience end-to-end (e2e) latency of less than 10 ms, for example.

Support for ultra-reliable transmission is contemplated. At least one design consideration may be to improve transmission reliability compared to what is possible with legacy LTE systems. For example, such improvement could target a 99.999% transmission success and/or service availability. Another consideration may be support for mobility for speed in the range of 0-500 km/h. It may be useful for at least ICC and/or V2X to experience Packet Loss Rate of less than $10e^{-6}$.

Support for MTC operation (e.g., including narrowband operation) is contemplated. The air interface may (e.g., efficiently) support narrowband operation (e.g. using less than 200 KHz). Extend battery life (e.g. up to 15 years of autonomy) is contemplated. Minimal communication overhead for small and/or infrequent data transmissions (e.g. low data rate in the range of 1-100 kbps with access latency of seconds to hours) is contemplated.

Support for mMTC use cases may utilize narrowband operation. The resulting link budget may be comparable to that of LTE extended coverage, perhaps for example while supporting a (e.g., very large) number of MTC devices (e.g., up to 200 k/km$^2$) perhaps without adverse impact on spectral efficiency for other supported services.

One or more of the design considerations described herein can be included into one or more design aspects described herein.

It may be useful for the 5G system design to enable flexible spectrum usage, deployment strategies, and/or operation.

The design may support operation using spectrum of varying size, including aggregation of non-adjacent carriers in the same and/or in different frequency bands, licensed, and/or unlicensed. The system may support narrowband and/or wideband operation, different duplexing methods (e.g., for TDD, dynamically variable DL/UL allocation), variable TTIs lengths, scheduled and/or unscheduled transmissions, synchronous and/or asynchronous transmissions, separation of user plane from the control plane, and/or multi-node connectivity.

The 5G system design integrating with a number of legacy (E-)UTRAN and EPC/CN aspects is contemplated.

Although there is no requirement for backward compatibility, the system may integrate and/or operate with one or more legacy interfaces (e.g., or evolution thereof) at least towards the legacy CN (e.g. the S1 interface, NAS) and/or eNBs (e.g. the X2 interface including dual connectivity with LTE), perhaps for example to enable legacy aspects such as support for existing QoS and/or security mechanisms.

Specific elements of the 5G design could be retrofitted in LTE Evolution (e.g. backward compatibility of some or all components are also considered). For example, TTIs shorter than a LTE slot (e.g., 0.5 ms) using a different waveform to enable ultra-low latency are contemplated. For example, operating the 5G physical layer (e.g., DL and/or UL) in TDM and/or in FDM with LTE.

One or more of the following functionality that may be supported by legacy systems is contemplated: Support for D2D/Sidelink operation; Support for LAA operation using LBT; and/or Support for relaying.

One or more (e.g., basic) principles for the Flexible Radio Access System for 5G—The 5gFLEX—are contemplated.

OFDM may be used as the (e.g., basic) signal format for data transmissions in LTE and/or in IEEE 802.11. OFDM may efficiently divide the spectrum into one or more, or multiple, parallel orthogonal subbands. One or more, or each, subcarrier may be shaped using a rectangular window in the time domain that may for example lead to sinc-shaped subcarriers in the frequency domain. OFDMA may use (e.g., perfect) frequency synchronization and/or tight management of uplink timing alignment, perhaps for example within the duration of the cyclic prefix to maintain orthogonality between signals and/or to minimize intercarrier interference. Such tight synchronization might not be well-suited in a system where a WTRU may be connected to multiple access points simultaneously. Additional power reduction may also be applied to uplink transmissions perhaps for example to comply with spectral emission requirements to adjacent bands (perhaps for example in particular in the presence of aggregation of fragmented spectrum for the WTRU's transmissions).

Some of the shortcomings of conventional OFDM (CP-OFDM) can be addressed by more stringent RF requirements for implementations, perhaps for example when operating using a large amount of contiguous spectrum that might not use aggregation. A CP-based OFDM transmission scheme may lead to a downlink physical layer for 5G, perhaps for example similar to that of legacy system (e.g. mainly modifications to pilot signal density and/or location).

The 5gFLEX design may consider other waveform candidates, although conventional OFDM remains a possible candidate for 5G systems, perhaps for example at least for the downlink transmission scheme.

One or more principles behind the design of a flexible radio access for 5G are described herein. One or more transmission schemes are contemplated.

The 5gFLEX downlink transmission scheme may be based on a multicarrier waveform characterized by high spectral containment (e.g., lower side lobes and/or lower OOB emissions). Possible MC waveform candidates for 5G include OFDM-OQAM and UFMC (UF-OFDM).

Multicarrier modulation waveforms may divide the channel into one or more subchannels and/or modulate data symbols on subcarriers in these one or more subchannels.

With OFDM-OQAM, a filter may be applied in the time domain per subcarrier to the OFDM signal, perhaps for example to reduce OOB. OFDM-OQAM may cause (e.g., very) low interference to adjacent bands, might not use large guard bands, and/or might not use a cyclic prefix. OFDM-OQAM may be a popular FBMC technique, but may be sensitive to multipath effects and/or to high delay spread in terms of orthogonality, thereby complicating equalization and/or channel estimation.

With UFMC (UF-OFDM), a filter may be applied in the time domain to the OFDM signal, perhaps for example to reduce OOB. Filtering may be applied per subband to use spectrum fragments that may reduce complexity and/or make UF-OFDM somewhat more practical to implement. Perhaps for example if there are unused spectrum fragment in the band, OOB emissions in these fragments may remain as high as for conventional OFDM. In other words, UF-OFDM may improve over OFDM at the edges of the filtered spectrum (e.g., perhaps for example at the edges only, and not in the spectral hole).

Techniques described herein might not be limited to the aforementioned waveforms and/or may be applicable to other waveforms. The aforementioned waveforms may be further used for example purposes.

Such waveforms may enable multiplexing in frequency of signals with non-orthogonal characteristics (e.g., such as different subcarrier spacing) and/or co-existence of asynchronous signals, perhaps for example without requiring complex interference cancellation receivers. It may facilitate the aggregation of fragmented pieces of spectrum in the baseband processing as a lower cost alternative to its implementation as part of the RF processing.

Co-existence of different waveforms within the same band is considered, perhaps for example at least to support mMTC narrowband operation (e.g. using SCMA), among other scenarios. Another example is of supporting within the same band, the combination of different waveforms (e.g. CP-OFDM, OFDM-OQAM and UF-OFDM) for one or more, or all, aspects, and/or for downlink and/or uplink transmissions. Such co-existence may include transmissions using different types of waveforms between different WTRUs or transmissions from the same WTRU (e.g. either simultaneously, with some overlap, and/or consecutive in the time domain).

Further co-existence aspects may include support for hybrid types of waveforms (e.g. waveforms and/or transmissions that support at least one of a possibly varying CP duration (e.g. from one transmission to another)), a combination of a CP and a low power tail (e.g. a zero tail), and/or a form of hybrid guard interval (e.g. using a low power CP and an adaptive low power tail), and/or the like. Such waveforms may support dynamic variation and/or control of further aspects, such as how to apply filtering (e.g. whether filtering is applied at the edge of the spectrum used for reception of any transmission(s) for a given carrier frequency, at the edge of a spectrum used for reception of a transmission associated to a specific SOM, per subband, and/or per group thereof).

The uplink transmission scheme may use a same and/or different waveform as for downlink transmissions. Multiplexing of transmissions to and/or from different WTRUs in the same cell may be based on FDMA and/or TDMA.

Uplink non-orthogonal transmissions may also be supported. One or more, or multiple, WTRUs may perform a transmission in the same set of resources, perhaps for example when the receiver in the network side implements advanced receiver technologies such as SIC (Successive Interference Cancellation), among other scenarios. For example, transmissions from different WTRUs may be spread over one or more, or multiple, PRBs. A (e.g., very) low MCS may be used as a form of spreading technique and/or WTRU-specific hopping may be used to maximize frequency and/or interference diversity. Transmissions may use a WTRU-specific DM-RS (e.g. for demodulation and/or decoding, and/or to determine the identity of the WTRU that performed the transmission). Such transmissions may be useful for (e.g., relatively small) data packets. Different WTRUs may perform uplink transmission in adjacent resources in frequency and/or in time, perhaps for example without tight timing synchronization. Such transmission methods may enable a WTRU to perform uplink transmissions, perhaps for example without having to first receive a grant from the network.

Spectrum Flexibility is contemplated. The 5gFLEX radio access design may be characterized by a (e.g., relative very) high degree of spectrum flexibility that may enable deployment in different frequency bands with different characteristics. The characteristics may include different duplex arrangements, different and/or variable sizes of the available spectrum including contiguous and/or non-contiguous spectrum allocations in the same and/or different bands. Variable timing aspects including support for multiple TTI lengths and/or support for asynchronous transmissions may be supported.

Flexibility in Duplexing Arrangement is contemplated. TDD and/or FDD duplexing schemes may be supported. For FDD operation, supplemental downlink operation may be supported, perhaps for example using spectrum aggregation. FDD operation may support full-duplex FDD and/or half-duplex FDD operation. For TDD operation, the DL/UL allocation may be dynamic (e.g., it might not be based on a fixed DL/UL frame configuration). The length of a DL and/or a UL transmission interval may be set per transmission opportunity.

Bandwidth Flexibility is contemplated. At least one characteristic of the 5gFLEX design is the possibility for different transmission bandwidths on uplink and/or downlink, perhaps for example ranging from anything between a nominal system bandwidth up to a maximum value corresponding to the system bandwidth.

For single carrier operation, the supported system bandwidths may include at least 5, 10, 20, 40 and/or 80 MHz. Supported system bandwidths could be any bandwidth in a given range (e.g. from a few MHz up to 160 MHz). Nominal bandwidths could possibly have one or more possible values (e.g., fixed). Narrowband transmissions of up to 200 KHz may be supported within the operating bandwidth for MTC devices.

Figure 2:
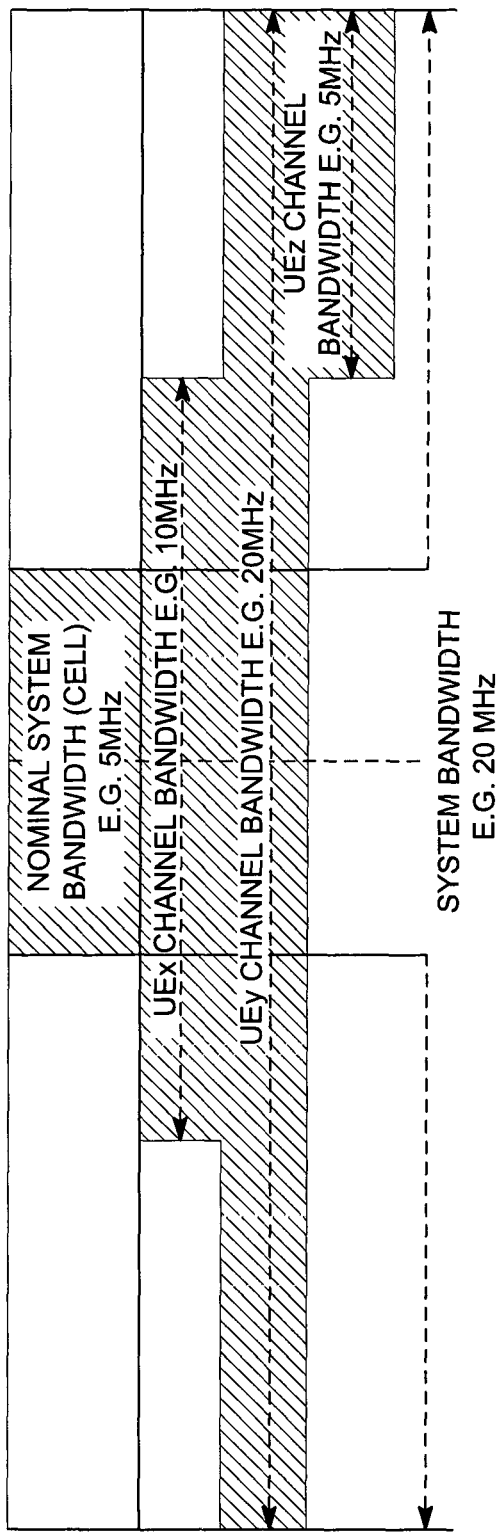
FIG. 2 illustrates example transmission bandwidths for a wireless transmit/receive unit (WTRU).

In one or more techniques, system bandwidth as used herein may refer to the largest portion of spectrum that can be managed by the network for a given carrier. For such a carrier, the portion that a WTRU may (e.g., minimally) support for cell acquisition, measurements, and/or initial access to the network may correspond to the nominal system bandwidth. The WTRU may be configured with a channel bandwidth that may be within the range of the entire system bandwidth. The WTRU's configured channel bandwidth may, or might, not include the nominal part of the system bandwidth as shown in FIG. 2.

Bandwidth flexibility can be achieved because one or more, or all, applicable set of RF requirements for a given maximum operating bandwidth in a band can be met, perhaps for example without the introduction of additional allowed channel bandwidths for that operating band. This may be due, at least in part, to the efficient support of baseband filtering of the frequency domain waveform.

The 5gFLEX physical layer may be band-agnostic and/or may support operation in licensed bands below 5 GHz and/or operation in the unlicensed bands in the range 5-6 GHz. For operation in the unlicensed bands, LBT Cat 4 based channel access framework similar to LTE LAA may be supported.

Flexible Spectrum Allocation is contemplated. Downlink control channels and/or signals may support FDM operation. A WTRU can acquire a downlink carrier, for example, by receiving transmissions using (e.g., using only) the nominal part of the system bandwidth (e.g., the WTRU might not initially receive transmissions covering the entire bandwidth that is being managed by the network for the concerned carrier).

Downlink data channels can be allocated over a bandwidth that may or might not correspond to the nominal system bandwidth, perhaps for example without restrictions other than being within the WTRU's configured channel bandwidth. For example, the network may operate a carrier with a 12 MHz system bandwidth using a 5 MHz nominal bandwidth. This may allow devices supporting (e.g., at most) 5 MHz maximum RF bandwidth to acquire and/or access the system, perhaps for example while allocating +10 to −10 MHz of the carrier frequency to other WTRU's that may be supporting up to 20 MHz, or more, worth of channel bandwidth.

Figure 3:
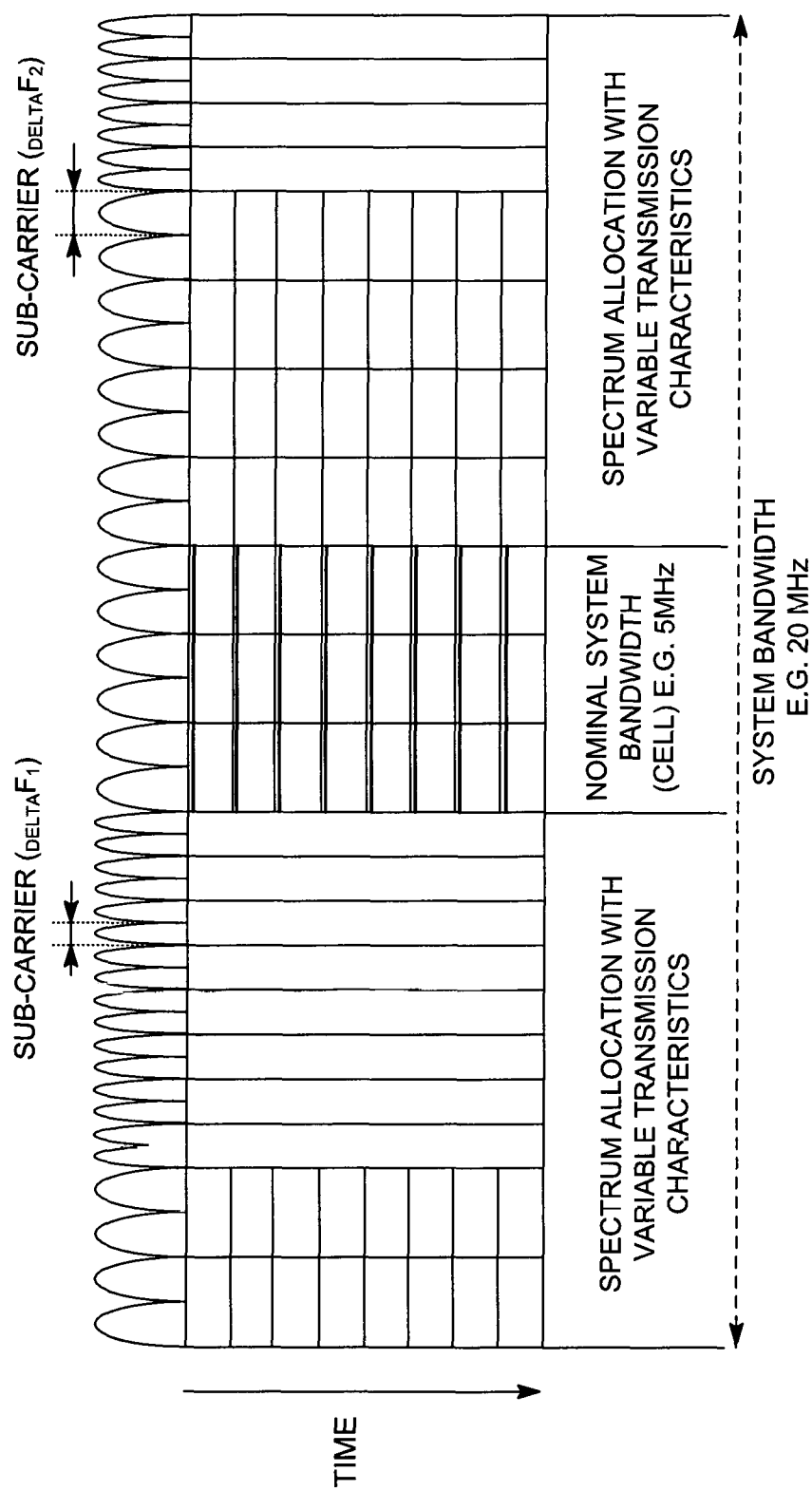
FIG. 3 illustrates an example of spectrum allocation.

FIG. 3 shows an example of spectrum allocation where different subcarriers may be at least conceptually assigned to different modes of operation (hereafter "SOM"). Different SOM can be used to fulfill different requirements, perhaps for example for different transmissions. A SOM may include at least one of: a subcarrier spacing, a TTI length, and/or one or more reliability aspects (e.g. HARQ processing aspects and/or a secondary control channel). A SOM may be used to refer to a specific waveform and/or may be related to a processing aspect (e.g. in support of co-existence of different waveforms in the same carrier using FDM and/or TDM, and/or in scenarios such as those in which the coexistence of FDD operation in a TDD band is supported (e.g. in a TDM manner or similar)).

Spectrum Aggregation is contemplated. For single carrier operation, spectrum aggregation may be supported, such that the WTRU may support transmission and/or reception of multiple transport blocks, perhaps for example over contiguous and/or non-contiguous sets physical resource blocks (PRBs), perhaps for example within the same operating band. Mapping of a single transport block to separate sets of PRBs is contemplated.

Support for simultaneous transmissions associated to different SOM requirements is contemplated. Multicarrier operation may be supported, perhaps for example by using contiguous and/or non-contiguous spectrum blocks, perhaps for example within the same operating band and/or across two or more operating bands. Aggregation of spectrum blocks using different modes (e.g., FDD and TDD) and/or using different channel access methods (e.g., licensed and/or unlicensed band operation below 6 GHz) may be supported.

Support for methods that configure, reconfigure, and/or dynamically change the WTRU's multicarrier aggregation is contemplated. Such high flexibility for spectrum aggregation might not require RF specification work to support additional channels and/or band combinations, perhaps for example because the use of efficient baseband filtering in the frequency domain.

Flexible Framing, Timing, and/or Synchronization are contemplated. Downlink and/or uplink transmissions may be organized into radio frames characterized by a number of fixed aspects (e.g. location of downlink control information) and/or a number of varying aspects (e.g. transmission timing and/or supported types of transmissions).

The basic time interval (BTI) may be expressed in terms of an integer number of one or more symbol(s). Symbol duration may be a function of the subcarrier spacing applicable to the time-frequency resource. For FDD, subcarrier spacing may differ between the uplink carrier frequency fUL and/or the downlink carrier frequency fDL for a given frame, for example.

A transmission time interval (TTI) may be the minimum time supported by the system between consecutive transmissions where one or more, or each, may be associated to different transport blocks (TBs) for the downlink (TTIDL), for the uplink (UL TRx) perhaps excluding any preamble (e.g., if applicable) and/or perhaps including any control information (e.g. DCI for downlink or UCI for uplink). A TTI may be expressed in terms of integer number of one or more BTI(s). A BTI may be specific and/or associated to a given SOM.

Supported frame duration may include 100 us, 125 us (1/8 ms), 142.85 us (1/7 ms is 2 nCP LTE OFDM symbols) and/or 1 ms, perhaps for example to enable alignment with the legacy LTE timing structure.

Fixed framing aspects are contemplated. A frame starts (e.g., perhaps always starts) with downlink control information (DCI) of a fixed time duration $t_{dci}$ that may precede any downlink data transmission (DL TRx) for the concerned carrier frequency—fUL+DL for TDD and/or fDL for FDD.

For TDD duplexing (e.g. perhaps for TDD duplexing only), a frame may include a downlink portion (DCI and/or DL TRx) and/or an uplink portion (UL TRx). A switching gap (swg) may precede (e.g., perhaps may always precede) the uplink portion of the frame (e.g., if present).

For FDD duplexing (e.g., perhaps FDD duplexing only), a frame may include a downlink reference TTI and/or one or more TTI(s) for the uplink. The start of an uplink TTI may be derived (e.g., perhaps may always be derived) using an offset (toffset) applied from the start of the downlink reference frame that overlaps with the start of the uplink frame.

For TDD, 5gFLEX may support D2D/V2x/Sidelink operation in the frame by including respective downlink control and/or forward direction transmission in the DCI+DL TRx portion (e.g., perhaps if a semi-static allocation of the respective resources may be used) and/or in the DL TRx portion (e.g., perhaps in the DL TRx portion only and/or for dynamic allocation) and/or by including the respective reverse direction transmission in the UL TRx portion.

Figure 4:
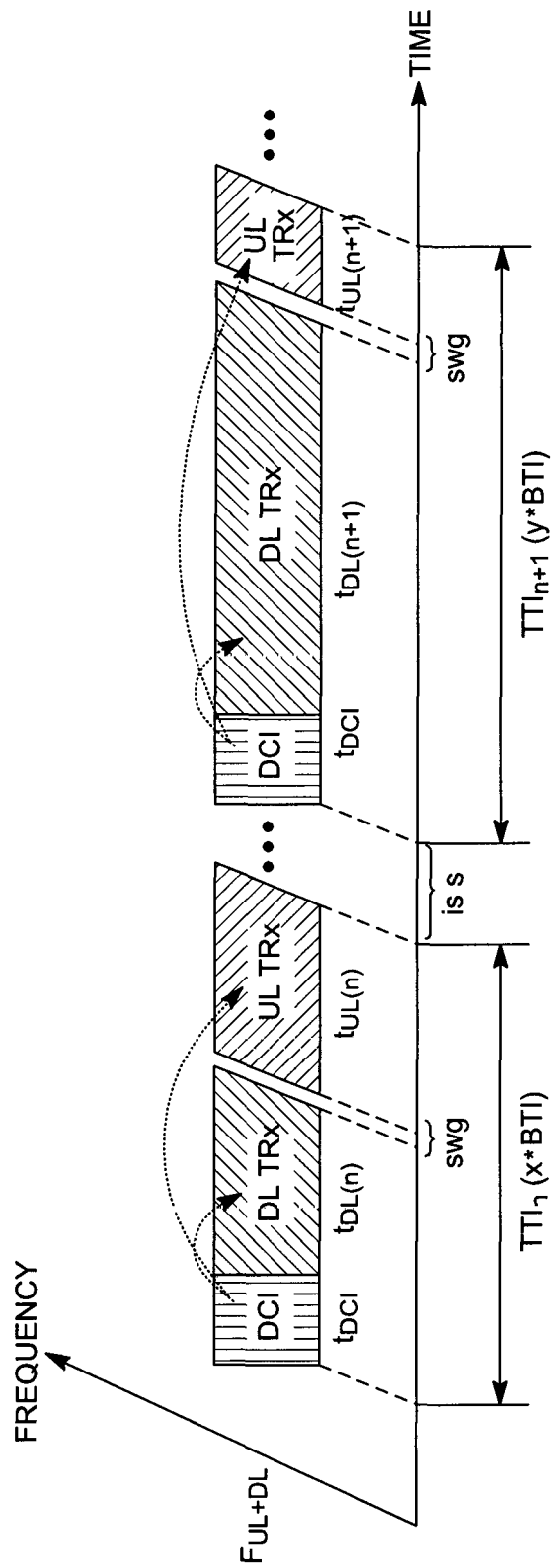
FIG. 4 illustrates an example of frame structure and timing relationships for TDD duplexing.
Figure 5:
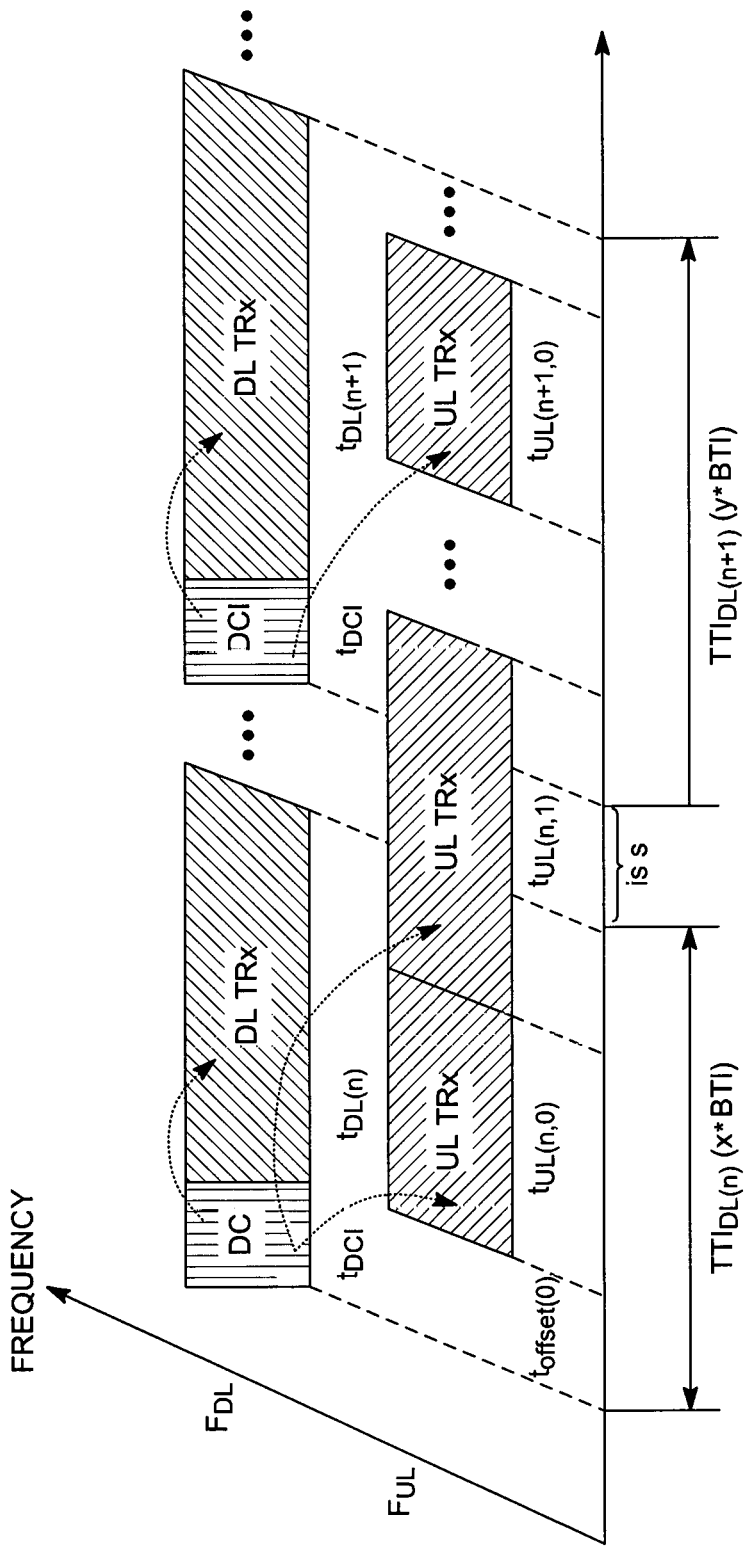
FIG. 5 illustrates an example of frame structure and timing relationships for FDD duplexing.

For FDD, 5gFLEX may support D2D/V2x/Sidelink operation in the UL TRx portion of the frame perhaps for example by including respective downlink control, forward direction, and/or reverse direction transmissions in the UL TRx portion (e.g., dynamic allocation of the respective resources may be used). An example frame structure and timing relationships are shown in FIG. 4 (TDD) and/or FIG. 5 (FDD).

Scheduling and/or Rate Control is contemplated. A scheduling function may be supported in the MAC layer. At least two scheduling modes may be supported: network-based scheduling for tight scheduling in terms of resources, timing and transmission parameters of downlink transmissions, and/or uplink transmissions; and WTRU-based scheduling for more flexibility in terms of timing and transmission parameters. For one and/or both modes, scheduling information may be valid for a single or for multiple TTIs.

Network-based scheduling is contemplated. Network-based scheduling may enable the network to tightly manage the available radio resources assigned to one or more, or different, WTRUs such as to optimize the sharing of such resources. Dynamic scheduling may be supported.

WTRU-based scheduling is contemplated. WTRU-based scheduling may enable the WTRU to opportunistically access uplink resources with minimal latency on a per-need basis, perhaps for example within a set of shared and/or dedicated uplink resources assigned (e.g., dynamically or not) by the network. Synchronized and/or unsynchronized opportunistic transmissions may be supported. Contention-based transmissions and/or contention-free transmissions may be supported.

Support for opportunistic transmissions (e.g., scheduled and/or unscheduled) may be included to meet the ultra-low latency requirements for 5G and/or the power saving requirement of the mMTC use case.

Logical Channel Prioritization is contemplated. 5gFLEX may support the association of data available for transmission and/or available resources for uplink transmissions. Multiplexing of data with different QoS requirements, perhaps for example within the same transport block may be supported, perhaps for example as long as such multiplexing neither introduces negative impact to the service with the most stringent QoS requirement, nor introduces unnecessary waste of system resources, among other scenarios.

Forward Error Correction (FEC) and/or Block Coding are contemplated. A transmission may be encoded using a number of different encoding methods. Different encoding methods may have different characteristics. For example, an encoding method may generate a sequence of information units. One or more, or each, information unit, or block, may be self-contained. For example, an error in the transmission of a first block might not impair the ability of the receiver to successfully decode a second block, perhaps for example if the second block may be error-free and/or if sufficient redundancy can be found in the second block and/or in a different block for which at least a portion was successfully decoded.

Examples of encoding methods include raptor/fountain codes in which a transmission may include a sequence of N raptor codes. One or more such codes may be mapped to one or more transmission "symbols" in time, for example. A "symbol" can correspond to one or more set of information bits (e.g. one or more octets). Such encoding may be used to add FEC to a transmission. The transmission could use N+1 and/or N+2 raptor codes (e.g. and/or symbols, perhaps assuming a one raptor code symbol relationship) so that the transmission may be more resilient to the loss of one "symbol" (e.g. perhaps due to interference and/or puncturing by another transmission overlapping in time).

The minimization of time between data becoming available for transmission until the WTRU may first become active in transmission for that data is contemplated. The reduction of transmission latency for data either in the eNB for downlink transmissions or in the WTRU for uplink transmissions is contemplated.

The following cases are contemplated, for example, focusing on L2 aspects, such as unsynchronized access (e.g., applicable to RRC IDLE and/or RRC CONNECTED) and synchronized access (e.g., applicable to RRC CONNECTED).

In unsynchronized access (e.g., applicable to both RRC IDLE or RRC CONNECTED), an unsynchronized access may be characterized, at least in part, such that the WTRU may have an invalid uplink timing alignment for a serving cell or for a group of serving cells for which it may use to access uplink resources. In this case, the primary contributor (e.g., or bottleneck) to latency may be related to the performance of the random access procedure to gain at least uplink timing alignment, such that the WTRU may subsequently perform uplink transmissions on dedicated resources (e.g. transmission of Uplink Control Information (UCI) on PUSCH or PUCCH, which UCI may include HARQ ACK/NACK related to the reception of downlink data) and/or transmission of uplink data on PUSCH.

For a WTRU in RRC IDLE mode, perhaps for example independently of whether transmissions are triggered by downlink data arrival (e.g., the WTRU receives paging) and/or by uplink data arrival (e.g., the WTRU initiates one or more procedures to acquire uplink resources such as for example, the RA-SR procedure in LTE, among other techniques), it may be useful to reduce the latency of the initial access. It may be useful in LTE to reduce latency of one or more of the (e.g., contention-based) random access procedure (e.g., for uplink timing alignment, initial power setting, C-RNTI allocation), the RRC Connection establishment procedure (e.g., for NAS and EPS bearer setup, L2/L3 configuration, security activation), and/or the scheduling of the first data packet for the service (e.g., or bearer) from reception of a grant for uplink data and/or from reception of a downlink assignment for downlink data may be difficult.

For a WTRU in RRC CONNECTED mode, reducing the latency of the random access procedure (e.g., initiated by RA-SR for uplink data arrival or by PDCCH reception for downlink data arrival) and/or the scheduling of the first data packet for the burst of data for a configured service (e.g., or bearer) are contemplated. Mobility when (e.g., first) accessing a target cell is contemplated.

Techniques to reduce latency may focus on reducing the latency associated with the random access procedure. In particular for RRC IDLE mode, such methods may be used in combination with other methods such as those described herein, e.g. methods that may reduce (e.g., or remove the need for) latency of the RRC Connection establishment procedure and/or the bearer setup and/or security activation procedure.

In synchronized access (e.g., RRC CONNECTED), a synchronized access may be characterized, at least in part, such that the WTRU has a valid uplink timing alignment for a serving cell or for a group of serving cells for which it may utilize to access uplink resources. In this case, the challenge for uplink data arrival may be to reduce the latency for the WTRU to get access to a dedicated resource for uplink transmissions, for example, on PUSCH. The primary contributor (e.g., or bottleneck) to latency may be the average time between occasions for performing scheduling request (SR), for example, by transmission of SR on a dedicated PUCCH resource (e.g., D-SR, if configured) or SR on PRACH (e.g., RA-SR, otherwise) and/or for performing a CB-PUSCH transmission (e.g., if such is configured and/or available). There may be a tradeoff between D-SR density, PRACH density and CB-PUSCH density and latency which comes to a cost in terms of resource usage. The challenge for downlink data arrival may be the tradeoff between power efficiency and PDCCH monitoring for DL assignments, for example, based on a Discontinuous Reception (DRX) algorithm (e.g., if configured).

The latency bottlenecks may be identified herein with their respective possible aspects to be addressed. A bottleneck may be a place where latency may be reduced and time may be saved with appropriate procedures or changes to existing procedures.

A bottleneck may occur at paging (e.g., RRC IDLE, DL data arrival). Extended paging may be in parallel with legacy paging. In this case, one issue to be addressed may be how to tell the WTRU that it should access the system faster than with legacy paging and connection establishment procedures. Extended paging with WTRU-controlled UL synchronization may enable grant. One issue to be addressed in this case may be how to enable an extension to the paging mechanism that may provide means for the WTRU to acquire uplink resources (e.g., dedicated grant or CB-PUSCH if synchronized state is available in RRC IDLE mode) and to transmit user plane data already in the first response to the paging request. And, if so, under what circumstances. Extended paging may trigger connection reactivation/re-establishment. One issue to be addressed in this case may be how to enable an extension to the paging mechanism that may provide means for the WTRU to perform some form of reconnection or reactivation of an existing and/or of a previous connection. If NW-based, paging may or might not include contextual information in addition to the WTRU's identity in the paging message. If WTRU-based, the response to paging may or might not include contextual information in addition to (e.g., or instead of) the connection establishment request, for example, using similar principles to the RRC Connection re-establishment procedure. And, if so, under what circumstances.

A bottleneck may occur in the random Access procedure (e.g., unsynchronized cases). For example, in WTRU-controlled UL synchronization, when unsynchronized and/or when not actively managed by the eNB's scheduler, how a WTRU may acquire (e.g., or maintain) uplink synchronization and/or initial power level other than using RACH may be addressed. Examples in which the WTRU transmits data without having acquired uplink synchronization, and/or which may utilized protection in time to avoid interference with other transmissions in the cell, may be deemed costly.

A bottleneck may occur in the access to uplink resources including Scheduling Request. Techniques contemplate how to efficiently request resources for uplink transmissions with minimal latency, for example, for dedicated transmissions and/or contention-based transmissions. Techniques contemplate how to efficiently access uplink transmission resources with minimal latency, for example, using methods such as semi-persistent allocation (SPS), pre-allocation, and/or contention-based uplink transmission channel.

Examples described herein may be backward compatible with legacy systems.

Examples are contemplated that reduce the latency for a WTRU to become active with data transmissions. These examples may be used independently, in combination with each other and/or in combination with other existing methods.

As described herein, the WTRU may be synchronized, for example, if it has valid uplink timing alignment and unsynchronized, for example, if it does not have a valid uplink timing alignment.

Examples to determine applicable functionality are contemplated. The WTRU may determine whether or not it uses the techniques described herein based on one or more, or a number, of criteria. One such criterion may be the RRC state (e.g., IDLE, CONNECTED, and/or being inactive in transmission for a, perhaps specific, amount of time). For example, a criterion may be support for the functionality using resources associated with a given cell (e.g., such as determined from the reception of broadcasted system information). For example, a criterion may be configuration aspects of the WTRU.

For a 5gFLEX system, or for further evolutions of the LTE system that may support similar functions as the 5gFLEX design approaches, applicability of one or more contemplated techniques may be a function of the SOM associated to a specific set of uplink resources. The applicability may be a function of the set and/or subset of the available resources, and/or of one of more characteristic(s) thereof, such as a type of associated control channel and/or any other aspects associated to the SOM as described herein. For example, a set of resources may be associated to a SOM that may support: transmissions using a TTI, perhaps for example not exceeding a specific duration (e.g. a TTI of some 100 μs duration); unscheduled and/or contention-based transmissions; non-orthogonal transmissions between different WTRUs; and/or a transmission method that might not require strict uplink timing synchronization (e.g. such as using a filtered type of waveform or the likes).

A configuration aspect may comprise RRC CONNECTED/Inactive mode and dedicated signaling. For example, a WTRU in RRC CONNECTED mode may determine that one or more of the examples described herein may be applicable if configured by the network. Such configuration may be received by dedicated signaling. For example, the WTRU in RRC CONNECTED mode may be configured using dedicated signaling to operate autonomously with the synchronization channel, such as RSSC described herein and/or DSS described herein. Such signaling and/or such configuration may be applicable for a WTRU in RRC-Inactive mode, for example, perhaps if such control signaling may be received in such a mode and/or perhaps if the WTRU was configured by the network prior to moving to that state.

For example, the WTRU in RRC CONNECTED mode may receive a RRC Connection Reconfiguration message with the mobilityControlInformation indicating that the WTRU may be expected to perform a change of serving cell. Such signaling may indicate that one or more of the techniques described herein may be applicable to the procedure. Such reconfiguration may be for a mobility procedure and/or for a reconfiguration of a secondary cell group (SCG) with dual connectivity (e.g. a change in PSCell for the SCG).

A configuration aspect may comprise RRC IDLE/Inactive mode and broadcasted signaling. For example, a WTRU in RRC IDLE mode may determine that one or more of the examples described herein may be applicable, for example, if supported and/or configured by the network. Such support information and/or configuration may be received by broadcasted signaling. For example, the WTRU in RRC IDLE mode may receive a configuration on a broadcast channel such that it may operate autonomously with the synchronization channel, such as RSSC described herein and/or DSS described herein. Such signaling and/or such configuration may be applicable for a WTRU in RRC-Inactive mode, if such control signaling may be received in such mode or if the WTRU was configured by the network prior to moving to that state or if the WTRU has moved to a different cell since it last received control signaling from the network.

A configuration aspect may comprise details on what may be cell-specific. Such configuration may be WTRU-specific or cell-specific. For example, configuration aspects that may be cell-specific includes, for example, support of extended paging functionality described herein, support and/or configuration of a synchronization channel, such as RSSC described herein and/or DSS described herein, support and/or configuration of pre-allocation or CB-PUSCH resources as described herein and may be received on the System Information Broadcast channel. In particular, such cell-specific information may be applicable for WTRUs in RRC IDLE mode (e.g., or for WTRU's in RRC-Inactive mode).

Extended paging functionality is contemplated. The combination of paging and immediate data transfer for a synchronized, IDLE/Inactive WTRU may be enabled. Such paging may be scheduling DL data for short data transfer (e.g., and/or (e)BSR) such as described herein) directly (e.g., HARQ A/N is possible) and/or L3 RRC configuration/reactivation/reconnection and/or may be granting uplink resources, such as for L3 RRC reactivation/reconnection request.

For example, the WTRU may use a paging mechanism such that the WTRU may monitor for downlink control signaling at specific occasions. Such paging occasion may be determined based on whether the legacy paging function may be used (e.g., extensions thereof as described herein) or a parallel paging function is used (e.g., such as described herein).

The structure of control signaling for extended paging functionality, for example, DCI/RNTI+PDSCH, DCI/RNTI+(CB-)grant, is contemplated. Such downlink control signaling may be at least one of the following: similar to legacy P-RNTI reception, in particular for extended paging; WTRU, or group-specific RNTI reception, for example based on configuration, on the DL; WTRU, or group-specific RNTI reception, for example based on configuration, on the UL.

In similar to legacy P-RNTI reception, in particular for extended paging, a DCI received on PDCCH (e.g., using P-RNTI) may indicate that a paging message is transmitted on the PDSCH. For example, such paging message may include extended information and/or control signaling (e.g., such as described herein).

For a WTRU, or group-specific RNTI reception, for example, based on configuration, in the DL, a DCI received on PDCCH (e.g., using a RNTI specific to the WTRU) may indicate that a transport block addressed to the WTRU is transmitted on the PDSCH. For example, such transport block may include data for the WTRU. For example, such data may be user plane data (e.g., for short downlink data transfers). For example, such data may consist of control signaling (e.g., such as described herein). If the transmission is for a specific WTRU, the WTRU may transmit HARQ feedback, for example, as described herein.

For WTRU, or group-specific RNTI reception, for example based on configuration, on the UL, a DCI received on PDCCH may indicate that a grant for an uplink transmission is available to the WTRU on (CB-) PUSCH. For example, the WTRU may be configured with a RNTI to this purpose. Such RNTI may be WTRU-specific, for example, such as a RNTI assigned to the WTRU using dedicated signaling. In such case, the network may assign the same RNTI to a plurality of WTRUs. For example, the network may allocate the same RNTI to multiple WTRUs, for example, if CB-PUSCH resources are available in the applicable cell(s). The WTRU may derive the RNTI based on a WTRU-specific identity. For example, such grant may be for a transmission of data on a PUSCH resource dedicated to the WTRU. For example, such grant may be for a transmission of data on a shared PUSCH resource, for example, using CB-PUSCH. For example, such data may be user plane data (e.g., for short downlink data transfers and/or (e)BSR, such as described herein). For example, such data may consist of control signaling (e.g., such as described herein). For example, if the WTRU is synchronized (e.g., according to any of the examples described herein), the WTRU may transmit on a PUSCH resource using the grant information. The WTRU may determine how to transmit (e.g., resource, timing, etc.) on the PUSCH using legacy methods or for a subset of parameters using examples described herein.

HARQ A/N may be applicable for extended paging functionality, for example, in case of WTRU-specific DCI. For examples described herein, if the WTRU is synchronized (e.g., according to any of the procedures described herein), the WTRU may transmit HARQ feedback on PUCCH. For example, such HARQ feedback may be transmitted for the reception of the DCI and/or for the reception of the associated PDSCH (e.g., if any). The WTRU may determine how to transmit (e.g., resource, timing) on the PUCCH based on the location of the received DCI on the PDCCH (e.g., based on the identity of the first Control Channel Element of the DCI similar to legacy methods) and/or using an offset determined from the received control signaling. If the DCI includes a downlink assignment for a delayed PDSCH assignment (e.g., as described herein), the WTRU may determine the applicable resource on PUCCH using a similar examples and/or using a timing based on the reception of the PDSCH.

RNTI decoding for extended paging functionality is contemplated. For the RNTI(s) that may be common to multiple WTRUs, a DCI may be received in the common search space of the cell. When such RNTI is configured by the network using dedicated signaling (e.g., the RNTI may be common to multiple WTRUs in the cell), a DCI may be received in a search space that may be common to the group of WTRUs and/or might not be part of the common search space of the cell.

Paging to synchronized WTRUs and DL data transfer, such as short DL data transfers or L3 (re)connection signaling (e.g., NW configures), is contemplated. Such paging functionality may be utilized to reduce latency for downlink data arrival, for example, when user plane data may be sent alongside the paging information (e.g., short data transfers). Such paging functionality may be utilized to reduce latency for (re-)establishment of an RRC connection when control plane data may be sent alongside with the paging information (e.g., fast (re-) connection establishment). The PDSCH transmission may be received with some delay, such as the delayed PDSCH assignment may be valid for a PDSCH transmission 4 ms after reception of paging. In particular, when combined with the use of a WTRU-based synchronization channel as described herein.

Paging to synchronized WTRUs and DL data transfer, such as DCI(DL)+PDSCH(RRC (re)connection), is contemplated. For example, the synchronized WTRU (e.g., possibly using any of the examples described herein) may determine from a (e.g., first) received DCI (e.g., and/or the PDSCH) in subframe n that it is being paged by the network. It may determine from a (e.g., second) DCI in subframe n (e.g., or later) that there is a PDSCH transmission in a possibly later subframe e.g. n+4. The WTRU may receive a L3 message that, for example, re-establishes, reconnect(s) or initiate the establishment of a RRC connection.

Paging to synchronized WTRUs and UL data transfer, such as NW-initiated L3 (re)connection signaling (e.g., triggers WTRU request), is contemplated. Such paging functionality may be utilized to reduce latency for (re-)establishment of an RRC connection. For example, a synchronized WTRU in RRC IDLE (e.g., or in RRC-Inactive) may receive a paging message together with a grant for an uplink transmissions, in which case the WTRU may initiate (e.g., immediately) initiate a RRC Connection Establishment or a connection re-establishment/reactivation procedure (e.g., if supported). In particular, when combined with the use of a WTRU-based synchronization channel as described herein.

Paging to synchronized WTRUs and UL data transfer, such as DCI(DL)+DCI(UL:CB-PUSCH(RRC (re)connection)), is contemplated. For example, the synchronized WTRU (e.g., using any of the examples described herein) may determine from a (e.g., first) received DCI (e.g., and/or a PDSCH) in subframe n that it is being paged by the network, and it may determine from a (e.g., second) DCI in subframe n (e.g., or later) that there may be a CB-PUSCH resource available in subframe e.g. n+4. The WTRU may then transmit a L3 message that, for example, re-establishes, reconnect(s) or requests the establishment of a RRC connection.

Extensions to legacy paging, and/or additional paging function is contemplated. For example, the WTRU may use such a paging mechanism either as extensions to an existing paging functionality (e.g., as described herein) or in parallel to a legacy paging mechanism (e.g., as described herein).

Extended Paging Information and/or Control Signaling is contemplated. Extensions may include means to identify the WTRU and a context and/or grant resources. For example, such extended paging information or control signaling may include at least one of the following: an identity; a grant for uplink transmission; and/or a CB-PUSCH trigger. An identity may be WTRU-specific, either in the cell or in an area. An identity may be used in conjunction with another identity that identifies the WTRU (e.g., such as the identity in the legacy paging message). An identity may be associated with a L3 context. For example, the identity may corresponds to a L3 context previously configured and/or used by the WTRU. The identity may have been part of the WTRU's configuration of the L3 context. The context may include an RRC Connection, a security context, a bearer configuration or any other aspect of the WTRU's configuration. One or more configuration aspects may also be included in the context. For example, the WTRU may determine that an RRC connection may be reactivated following reception of such control signaling. For example, the WTRU may perform such behavior when such signaling may be received when the WTRU is in RRC IDLE mode or in RRC-Inactive mode. A grant for uplink transmission may be received in a DCI similar to the legacy grant information or on PDSCH, for example, similar to a grant received in the legacy RAR. A CB-PUSCH trigger may comprise the WTRU receiving an indication to initiate a transmission on CB-PUSCH.

An extended paging may trigger L3 (re-)connection procedure, with no RACH needed. The WTRU may initiate a L3 procedure that (re-)establishes or reactivates an RRC connection upon reception of such control signaling. If the received control signaling includes a grant for an uplink transmission, the WTRU may transmit the connection request using the received grant. For example, the response to the received control information (e.g., a connection request) may include the received identity. For example, the response may include a unique transaction identifier. Such identifier may be generated by ciphering and/or performing integrity protection of the received identity using the security context associated with the received identifier and may subsequently be used to validate the L3 procedure. Additional validation may be based on successful authentication and/or deciphering of a subsequent L3 message received from the network (e.g., a connection reconfiguration). This may be useful in case L3 context identities may collide in the paging functionality.

Extended paging information and control signaling may be applicable to CONNECTED but inactive/synchronized WTRUs. In one example, the WTRU may receive such control information when in RRC CONNECTED (e.g., or in RRC-Inactive) mode. In such case, the WTRU may transmit user plane data (e.g., immediately) using the received grant.

Paging extensions is contemplated. In one example, such paging mechanism may be based on the legacy paging functionality with the addition of a number of extensions. [Monitoring of legacy paging channel+additional occasions]

Monitoring of legacy paging channel and additional occasions for extended paging is contemplated. For example, the paging occasions that may be specific to the extending mechanism may be a subset of the typical (e.g., legacy) paging occasions (e.g., low frequency). For example, the set of legacy paging occasions may be augmented such that the WTRU may use additional paging occasions. For example, the paging occasions that are specific to the extended mechanism may use a period that corresponds to a fraction of the period used for the typical (e.g., legacy) paging occasions (e.g., high frequency so latency gain is a fixed ratio of the IDLE mode latency). In this case, some or all of the legacy paging occasions may overlap with an occasion for the extended mechanism (e.g., for alignment for better WTRU power savings).

Signaling inside paging channel and backward compatible extensions for extended paging is contemplated. For example, the paging information received using the legacy paging function may include at least one of the type of information described herein.

Parallel paging function is contemplated. In one example, such paging mechanism may be configured to operate in parallel with legacy functionality, such as legacy paging (e.g., in idle mode or in inactivity mode) or such as PDCCH monitoring (e.g., including DRX when in connected mode, or in inactivity mode).

Monitoring of parallel paging channel is contemplated. For example, the WTRU may determine specific paging occasions. For example, a similar function may be used to derive a set of occasions that are mutually exclusive to the legacy paging occasions (e.g., any frequency may be possible). For example, the set of legacy paging occasions may be augmented such that the WTRU may use additional paging occasions. For example, the paging occasions that are specific to the extended mechanism may correspond to a subset of the (e.g., legacy) paging occasions (e.g., low frequency). For example, the paging occasions that are specific to the extended mechanism may use a period that corresponds to a fraction of the period used for the (e.g., legacy) paging occasions (e.g., high frequency so latency gain may be a fixed ratio of the IDLE mode latency). In this case, some or all of the legacy paging occasions may overlap with an occasion for the extended mechanism (e.g., for alignment for better UE power savings).

Signaling inside paging channel for parallel paging function is contemplated. For example, the paging information received using the parallel paging function may include at least one of the type of information described herein.

WTRU-autonomous uplink timing synchronization is contemplated. A WTRU may autonomously maintain valid uplink synchronization at low cost to the WTRU and/or to the network without being managed by the scheduler (e.g., independent from the connectivity state of the WTRU). The immediate uplink transmissions in any RRC mode may be enabled, for example, to circumvent the need for the random access procedure.

The WTRU may use a channel that is akin to a subset of the functionality of the PRACH. When synchronized, the WTRU may use a signal that is akin to a SRS transmission. The WTRU may autonomously remain in a synchronized state, for example, possibly without requesting uplink resources, possibly without performing a transmission on a dedicated resource, and possibly without being actively managed by the scheduler (e.g., for WTRUs in RRC Connected mode but inactive) and/or without being known to the network (e.g., for WTRU's in RRC IDLE mode). The examples for WTRU-autonomous uplink timing synchronization may be applicable to WTRU-autonomous mobility (e.g., if such is supported in RRC Connected mode or in Inactive mode) and to IDLE mode mobility. The WTRU-autonomous uplink timing synchronization may enable quicker access to a PUSCH transmission, such as CB-PUSCH. For example, the examples may work well in combination with CB-PUSCH (e.g., dynamically granted or not) and pre-allocation mechanism (e.g., similar to SPS). The resources used may have a smaller overhead. For example, the method for WTRU-autonomous uplink timing synchronization may be based on a shared channel. Possibly, the method may make use of a shared channel for initially gaining uplink synchronization and use a dedicated resource/channel otherwise.

The RSSC resources for WTRU-autonomous uplink timing synchronization may be distinct (e.g., preamble, PRB or time) from PRACH. The RSSC resources may be distinct from DSS resources (e.g., type, time). The WTRU may be configured with resources for performing the uplink transmissions necessary for the WTRU-autonomous uplink synchronization procedure. Different types of signals may have different resource configuration, such as in time and frequency. For example, the RSSC may be configured with specific resources in terms of time (e.g., RSSC transmission occasions), frequency (e.g., in terms of starting PRB) and length (e.g., in terms of number of PRBs for the signal, such a six PRBs may be used). For example, for a DSS signal that may be similar to a sounding signal (e.g., SRS), resources similar to the legacy SRS may be configured for the WTRU, including periodic transmission occasions.

Procedural aspects for WTRU-Autonomous Synchronization are contemplated. A WTRU may acquire and maintain DL timing synchronization. The WTRU may acquire and maintain downlink synchronization to a cell. Such downlink timing synchronization may be based on downlink reference signals. Such signals may include PSS, SSS or CRS. For example, the WTRU in RRC CONNECTED mode (e.g., or in RRC-Inactive mode) may be configured with such a cell as a serving cell. For example, the WTRU in RRC IDLE mode (e.g., or in RRC-Inactive mode) may be camping on such a cell.

The WTRU may be configured with a synchronization channel/signal/procedure. The WTRU may receive (e.g., either from broadcast signaling, or from dedicated signaling) a configuration for the WTRU-autonomous synchronization procedure.

The WTRU may determine to use a synchronization procedure, for example, when in CONNECTED mode. For example, the WTRU in RRC CONNECTED mode (e.g., or in RRC-Inactive mode) may receive dedicated signaling to this effect. The WTRU may receive dedicated signaling (e.g., L2/MAC CE, or L3/RRC) that may indicate that the WTRU may use the procedure for the purpose of maintaining uplink timing synchronization.

The WTRU may determine to use a synchronization procedure, for example, when in IDLE mode. For example, the WTRU in RRC IDLE mode (e.g., or in RRC-Inactive mode) may receive broadcasted signaling to this effect. The WTRU may determine to use such synchronization procedure based on RRC state and/or based on whether or not it may determine that the cell supports such procedure and related transmissions.

A configuration may comprise, for example, TAT, prohibit, Max retransmissions or timer. The WTRU may be configured with an initial value for the Timing Alignment Timer ($TAT_{UE\_SYNC}$) associated with the synchronization procedure. This value may be equivalent to the value of the TAT (e.g., if TAT is configured and/or available). $TAT_{UE\_SYNC}$ may be referred to as TAT. The WTRU may be configured with a maximum period for updating the UL timing alignment. The period may be a fraction of the value of the TAT. The WTRU may be configured with a prohibit timer and/or with a retransmission timer and/or with a maximum number of attempts for a given WTRU-autonomously initiated synchronization procedure, some or all of which may be applicable to transmission of uplink synchronization requests.

Triggers for WTRU-autonomous uplink transmission request/WTRU-autonomous uplink synchronization are contemplated. The WTRU may determine to perform a WTRU-autonomous uplink synchronization based on detecting one or more triggers. For example, the WTRU may transmit an uplink transmission request and/or perform autonomous UL timing adjustment/synchronization based on one or more of the WTRU TAT status, occurrence of mobility event and/or change of cell, reception of downlink signaling by the WTRU (e.g. RSSC trigger or aperiodic trigger), data being available for transmission (e.g., SR overload), the DL timing reference (e.g., a change in the DL timing reference), and/or DL pathloss measurements (e.g., a change in the pathloss measurements).

The TAT status may be used as a trigger for the WTRU to perform autonomous UL timing adjustment and/or to perform an uplink transmission request. For example, the WTRU may perform autonomous UL timing adjustment and/or may perform an uplink transmission request based on determining that the TAT is about to expire. For example, the WTRU may perform autonomous UL timing adjustment and/or may perform an uplink transmission request upon determining that less than a certain amount or number of WTRU-autonomous timing occasions are remaining/available until the expiration of the TAT (e.g., the number of remaining occasions may be 1, 2, etc.).

Occurrence of a mobility event and/or change of cell may be used as a trigger for the WTRU to perform autonomous UL timing adjustment and/or to perform an uplink transmission request. For example, the WTRU may perform autonomous UL timing adjustment and/or may perform an uplink transmission request based on determining that it has changed cell. Such change of cell may be due to a network-controlled handover (e.g., in CONNECTED, Inactive mode), a WTRU-autonomous cell reselection (e.g. in IDLE, Inactive mode), and/or WTRU-autonomous forward mobility (e.g., if supported in CONNECTED mode). For example, certain mobility events and/or certain types of cell changes may trigger the WTRU to perform autonomous UL timing adjustment and/or an uplink transmission request, while other types might not trigger the autonomous UL timing adjustment and/or uplink transmission request.

Reception of downlink signaling (e.g., RSSC trigger or aperiodic trigger) may be used as a trigger for the WTRU to perform autonomous UL timing adjustment and/or to perform an uplink transmission request. For example, the WTRU may be configured to decode a DCI on PDCCH using a specific RNTI (e.g., either WTRU-specific, group-specific or cell-specific). Such DCI may indicate that resources for uplink transmission request and/or UL timing alignment are available to the WTRU.

Data being available for transmission (e.g., SR overload) may be used as a trigger for the WTRU to perform autonomous UL timing adjustment and/or to perform an uplink transmission request. For example, the WTRU may determine that uplink data has become available for transmission and may perform autonomous UL timing adjustment and/or may perform an uplink transmission request based on determining the data is available for transmission. For example, a trigger for performing autonomous UL timing adjustment and/or performing an uplink transmission request may correspond to data of a specific bearer becoming available for transmission (e.g., other bearers might not trigger the request). A trigger for performing autonomous UL timing adjustment and/or performing an uplink transmission request may correspond to an amount of data that has specific QoS requirements becoming available for transmission. A trigger for performing autonomous UL timing adjustment and/or performing an uplink transmission request may correspond to the amount of data being available for transmission being relative to (e.g., below) a certain threshold. The triggers based on data becoming available for transmission (e.g. amount of data, identity of the bearers, the threshold based triggers, etc.) may be configuration aspects of the WTRU and may be received as configured parameters. For example, the occurrence of data being available for transmission may be a trigger for the WTRU to perform autonomous UL timing adjustment and/or to perform an uplink transmission request when the WTRU is unsynchronized, but not when the WTRU is synchronized. For example, the WTRU may perform autonomous UL timing adjustment and/or perform an uplink transmission request when it is also requesting uplink transmission resources, (e.g., such as SR and/or CB-SR), but not when it is not requesting uplink transmission resources.

Information related to and/or changes in the DL timing reference may be used as a trigger for the WTRU to perform autonomous UL timing adjustment and/or to perform an uplink transmission request. For example, the WTRU may determine that a change in the downlink synchronization has occurred and may perform autonomous UL timing adjustment and/or may perform an uplink transmission request based on determining that a change in the downlink synchronization has occurred. For example, the WTRU may determine that a change in DL timing has occurred based on downlink synchronization signal(s). Examples of downlink synchronization signals that may be used to determine if a change in DL timing has occurred may include one or more of a Primary Synchronization Signal (PSS) and/or a Secondary Synchronization Signal (SSS). The determination that a change in DL timing has occurred may be based on reception of best/strongest path for the synchronization signals. For example, the signals used to determine if a change in DL timing has occurred may be other type of reference signals such as Cell-specific Reference Signals (CRS) or other signals that serve similar purposes. The WTRU may determine that a change in DL timing has occurred due to an autonomous update of the value of $N_{TA}$. For example, WTRU may determine that a change in DL timing has occurred when the WTRU performs an autonomous update of the value of $N_{TA}$ that exceeds a certain threshold. For example, if the updated value for $N_{TA}$ exceeds the value of $N_{TA}$ at the time the WTRU last received a TAC from the eNB by a certain threshold, the WTRU may determine that a change in DL timing has occurred. For example, if the cumulative updates to the value of $N_{TA}$ since the WTRU last received a TAC from the eNB exceeds a certain threshold the WTRU may determine that a change in DL timing has occurred.

DL Pathloss measurements (and/or change in received power levels) may be used as a trigger for the WTRU to perform autonomous UL timing adjustment and/or to perform an uplink transmission request. The WTRU may perform pathloss measurements and/or estimation of pathloss. The WTRU may determine that a change in downlink pathloss has occurred and the WTRU may perform autonomous UL timing adjustment and/or may perform an uplink transmission request based on determining that the change in downlink pathloss has occurred. For example, if a change in pathloss estimation exceeds a certain threshold the WTRU may perform autonomous UL timing adjustment and/or may perform an uplink transmission request. For example, if a pathloss estimation exceeds the pathloss estimated at the time the WTRU last received a TAC from the eNB by a certain threshold, the WTRU may perform autonomous UL timing adjustment and/or may perform an uplink transmission request. For example, if the cumulative changes in pathloss estimation since the WTRU last received a TAC from the eNB exceeds a certain threshold, the WTRU may perform autonomous UL timing adjustment and/or may perform an uplink transmission request. Using pathloss as a trigger performing autonomous UL timing adjustment and/or performing an uplink transmission request may be particularly applicable for TDD systems and/or for cells with high level of channel reciprocity between the downlink and the uplink, although such techniques may also be used in FDD systems. Using pathloss as a trigger, autonomous UL timing adjustment and/or uplink transmission requests may be used in combination with a determination of a change in DL timing. For example, the WTRU may initiate the uplink synchronization procedure to perform autonomous UL timing adjustment and/or perform an uplink transmission request based on the occurrence of both a change in pathloss and a change in DL timing. For example, the trigger may be based on the occurrence of either a change in pathloss or a change in DL timing (e.g., when one or more criteria would be met for the same, or different, serving cells).

Transmission of uplink transmission request is contemplated. When the WTRU determines that it may transmit an uplink timing synchronization request, the WTRU may perform at least one of the following: the WTRU may count the number of transmissions of uplink transmission request; the WTRU may transmit the uplink synchronization transmission request; and/or the WTRU may start a supervisory timer for the procedure/retransmission. When the WTRU may count the number of transmissions of uplink transmission request, the WTRU may increment its transmission count. If the WTRU determines that the count exceeds the maximum number of attempts, the WTRU may determine that the synchronization update procedure was not successful. If no transmission count is used, then it may be equivalent to setting the value to 1. When the WTRU may transmit the uplink synchronization transmission request, the WTRU may perform a transmission of an uplink synchronization request, for example, using either the RSSC or the DSS as described herein. When the WTRU may start a supervisory timer for the procedure/retransmission, the WTRU may start a retransmission timer, and if the WTRU determines that the retransmission timer has expired, the WTRU may determine that it shall transmit another uplink timing synchronization request at the next occasion. If no retransmission is used for the synchronization update procedure, it may be equivalent to setting the value of the timer to infinity.

If the WTRU autonomously determines that it may perform a transmission, it may perform the above in the subframe that correspond to the next transmission occasion for the channel. Otherwise, the WTRU may use the first occasion that occurs no later than a specific period (e.g., x ms) after the reception of the control signaling (e.g., NW-ordered) that triggered such transmission or after the expiration of a timer, such as TAT.

The WTRU may determine when to receive the response. For example, the WTRU may determine that the response to the request may be expected in one of a set of one or more (e.g., consecutive) subframe(s). For example, in case the response is synchronized with the occasion for the uplink transmission of the request in subframe n, the WTRU may determine that the set consist of exactly one subframe, for example, subframe n+x where x may correspond to a processing time e.g. x=4. For example, in case the response is not synchronized to such granularity, the WTRU may determine that the set consist of a plurality of subframes, such as subframes [n+x, n+y] where x may correspond to a processing time e.g. x=4 and where y may correspond to the length of a reception window. The WTRU may determine that it has not successfully received a response if it cannot successfully decode such response in any such subframe(s).

When the WTRU successfully receives a response from the network to the uplink timing synchronization request, the WTRU may perform at least one of the following: the WTRU may start (e.g., or restart) the applicable TAT; or, the WTRU may set the initial transmission power to the value used by the last performed transmission of the uplink timing synchronization request.

When the WTRU determines that it has failed to receive a response for the transmitted uplink timing synchronization request, the WTRU may perform at least one of the following: the WTRU may perform a random backoff, for example, if retransmissions are not applicable to the synchronization update procedure; or the WTRU may start a prohibit timer, for example, if retransmissions are not applicable to the synchronization update procedure.

When the WTRU determines that it has failed to complete the synchronization procedure (e.g., the WTRU fails to access uplink timing synchronization channel and/or to get a response for the transmission of a request), the WTRU may perform at least one of the following: the WTRU may retry later; the WTRU may perform a legacy access procedure; the WTRU may change RRC state in case such procedure is necessary to the state; and/or the WTRU may invalidate the configuration for the synchronization procedure. If the WTRU derides to retry later, the WTRU may start a prohibit timer. The WTRU might not initiate a transmission of a synchronization update request while the timer is running. If the WTRU performs a legacy access procedure, the WTRU may perform the legacy procedure for accessing resources of the cell. For example, this may be applicable if the procedure is triggered due to reception of paging, such as described herein, for example, for DL data arrival and/or for RRC connectivity. For example, this may be applicable if the procedure is triggered due to data becoming available for transmission in the WTRU and if the request is used for requesting uplink resources for transmission. If the WTRU changes the RRC state in case such procedure is necessary to the state, the WTRU may transit to RRC IDLE, for example, if the WTRU performs this transition from the RRC-Inactive state. The WTRU may first initiate the transmission of a L3 notification to the network, for example, if the WTRU performs this transition from the RRC CONNECTED state. If the WTRU invalidates the configuration for the synchronization procedure, the WTRU may invalidate the configuration of the channel (e.g., SSRC) or the configuration for the signal (e.g., DSS) used for transmission of the uplink synchronization request. The WTRU may invalidate the configuration of the procedure itself (e.g., including both RSSC and DSS, if configured), for example, for a configuration that was received by dedicated signaling and/or for a configuration that is dedicated to the WTRU.

A Random Shared Synchronization Channel (RSSC) is contemplated. For example, a WTRU may obtain and/or maintain uplink synchronization using a physical uplink channel designed for this purpose, among other scenarios. A transmission using such a channel may include data (e.g. control plane data and/or user plane data).

The channel used for autonomously obtaining and/or maintaining uplink synchronization may be referred to as the RSSC. For example, the RSSC may be a PRACH-like channel. The RSSC may use a waveform with certain spectral containment properties (e.g. for CB-PUSCH), for example a waveform that has better spectral containment than legacy LTE waveforms (e.g., SC-FDMA). Transmissions on the RSSC might not be performed even when the WTRU might lack tight uplink synchronization. For example, transmissions on the RSSC may include a cyclic prefix and/or a guard band to protect against interference from transmissions from other WTRUs on adjacent subcarriers and/or in adjacent TTIs. Transmissions on the RSSC may use a different (e.g., a second) transmission method (and/or mode, type, etc.) than a (e.g., first) transmission method that may be utilized when the WTRU has uplink synchronization. For example, the second transmission method may be a non-orthogonal uplink transmission. For example, the transmissions on the RSSC may be based on a different waveform, such as a filtered OFDM waveform. For example, the waveform utilized for transmission on the RSSC may be characterized by relatively high spectral containment that may facilitate reception at the receiver, perhaps for example even when the transmission is performed with less stringent synchronization at the transmitter compared to the synchronization requirements when transmission are performed using a first method that uses a cyclic-prefix based OFDM transmission. Such transmission techniques may be performed according to principles of the 5gFLEX system described herein, or the like. Transmissions by the WTRU on the RSSC may include data (e.g., control plane and/or user plane information). For example, transmissions on the RSSC may be used for contention-based access channel. For example, RSSC resources may be allocated to the WTRU using dynamic signaling on PDCCH and/or by semi-static provisioning (e.g., RRC signaling). The RSSC resources may be located in the PUSCH region of the uplink carrier (e.g., CB-PUSCH) and/or in a region dedicated for transmission of RSSC signals (e.g., in coexistence with legacy LTE transmissions). The RSSC resources may be pre-allocated to the WTRU using semi-persistent configuration, and/or the like.

The RSSC may be used for obtaining and/or for maintaining uplink synchronization for WTRUs that might not be actively being scheduled. For example, the RSSC may be used for maintaining uplink synchronization for WTRUs that have not been scheduled using dedicated signaling. In such scenarios, among others, the WTRU may autonomously initiate a transmission on such a channel. For example, the RSSC may be used by a WTRU, perhaps without receiving an explicit allocation of resources. The network may be unaware of the identity of the WTRU that is utilizing the RSSC and/or transmitting on such a channel, and/or may continue to be unaware of the identity of the WTRU during the RSSC use. In one or more techniques, WTRU-specific demodulation reference signals may be used to indicate the identity of the transmitting WTRU.

The WTRU may use the RSSC prior to and/or as a prelude to the use of CB-RNTI grants. For example, the RSSC may be available to WTRUs in IDLE mode and/or may be available to WTRUs in RRC CONNECTED mode in long DRX. A transmission on the RSSC may be a way for the WTRU to signal a request for a CB-PUSCH resource. A request for a CB-PUSCH resource may be referred to as a CB-SR. For example, a transmission on the RSSC may include an indication of a size of a request CB-PUSCH and/or PUSCH resource (e.g., minimum guaranteed size or specific size, etc.). A response to a WTRU transmission on the RSSC may include one or more of a TAC, a transmit power control (TPC) and/or parameters for CB-PUSCH access, such as CB-RNTI for PDCCH decoding.

For example, the WTRU may obtain and/or maintain uplink synchronization using a physical uplink channel designed for the synchronization update procedure.

Synchronization may be possible without pro-active actions from the scheduler. Such channel might not utilize the allocation of dedicated resources. Such a channel might not require knowledge of the identity of the WTRU by the network. The WTRU may use this channel as a prelude to other types of uplink transmissions using resources requiring uplink timing alignment. Such channel may be accessible to WTRUs in IDLE mode and to WTRUs in RRC CONNECTED mode, including WTRUs in long DRX.

Transmissions on RSSC may share similar principles as PRACH transmissions. The RSSC may be similar in structure and in configuration to the legacy PRACH channel. The RSSC may be configured such that the network may distinguish between PRACH and RSSC. The RSSC and PRACH may be distinct channels from a WTRU and a system perspective.

A second/different waveform may be used to directly access CB-PUSCH resources. For example, the RSSC may be a contention-based channel for PUSCH-like transmissions, e.g., similar to the CB-PUSCH channel, but may utilize a second transmission method and/or different waveform. For example, wherein used herein the term a second transmission method may refer to a transmission method that uses a different waveform than a first transmission method (e.g., a waveform that is different than the waveform used in legacy LTE systems such as SC-FDMA). For example, the second transmission method may use a filtered-type of OFDM waveform (e.g., Filtered Bank Multi Carrier OFDM-FBMC-OFDM and/or Universal Filtered OFDM-UF-OFDM, etc.).

Signaling aspects, such as uplink timing synchronization request, are contemplated. For example, the signal transmitted on RSSC may be similar to a preamble on PRACH. For example, a transmission format for RSSC may be characterized by at least one of the following: CP/guard size (e.g., the signal may include protection for timing misalignment); preamble length (e.g., the signal may be transmitted over one or multiple subframes); number of PRBs (e.g., the signal may be transmitted over one or multiple PRBs); and/or transmission method (e.g., the signal may be transmitted using a different transmission mode/waveform).

A transmission format for RSSC may be characterized by a signal including protection for timing misalignment. For example, a transmission format for RSSC may be characterized by a CP/guard size. The transmission of a signal on the RSSC may include a guard in time (e.g., a CP/guard size). A reduced/limited maximum cell size may enable smaller cyclic prefix/guard. For example, a transmission format for RSSC may include a prefix/guard of 0.05 ms, e.g., for cells up to 7.46 km in radius.

A transmission format for RSSC may be characterized by transmitting a signal over one and/or multiple subframes. For example, a transmission format for RSSC may be characterized by a preamble length. If the signal is transmitted over one or multiple subframes, the signal transmitted on the RSSC may be similar to a preamble used on PRACH, such as preamble length. Reduced/limited maximum cell size may allow for a smaller number of prefixes and/or eases preamble power detection at the receiver. This may enable shorter preambles, such as 0.4 ms. For example, if a subset of access attempts utilized low latency (e.g., new WTRU rules may be implemented to enforce this), fewer WTRUs may concurrently access such resource than for a normal PRACH resource. A preamble format four may be used for TDD. The preamble format 4 may have a sequence length of 0.1 ms for UpPTS. Shorter preambles with higher initial power may be used.

A transmission format for RSSC may be characterized by transmitting a signal over one or multiple PRBs. For example, a transmission format for RSSC may be characterized by a number of PRBs. When the signal may be transmitted over one or multiple PRBs, the signal transmitted on the RSSC may be similar to a preamble used on PRACH such that 6 PRBs may be used (e.g., number of PRBs). Fewer than 6 PRBs may be used, for example, if enabled by the use of shorter preambles and better preamble detection at the receiver.

A transmission format for RSSC may be characterized by transmitting a signal using a different transmission mode/waveform. For example, a transmission format for RSSC may be characterized by a transmission method. The signal using a different transmission mode/waveform, and/or the transmission used to obtain uplink synchronization, may be transmitted as described herein. For example, such transmission may be a non-orthogonal transmission. The WTRU for example may access a CB-PUSCH resource by performing a transmission using a second transmission method based on a different waveform, such as, e.g., a filtered OFDM waveform (e.g., Filtered Bank Multi Carrier OFDM-FB-OFDM, and/or Universal Filtered OFDM-UF-OFDM, etc.). The transmission using the second transmission method based on a different waveform may include data (e.g. control plane data and/or user plane data). The WTRU may subsequently receive a TAC and resume transmissions according to the first transmission method (e.g. legacy cyclic-prefix based LTE transmissions or similar).

The resources used may be dynamically scheduled to control overhead. RSSC occasions and/or resources may be semi-statically configured, for example, in SIB. RSSC occasions and/or resources may be dynamically scheduled, for example, using a RNTI. Such RNTI may be common for a subset of, or all, WTRUs in a cell and one or more (e.g., each) WTRU may be configured with a specific frequency offset and/or signature (e.g., a preamble). The RSSC occasion may be common to multiple WTRUs and the resource (e.g., in terms of PRB(s), or in terms of signature, such as a preamble) utilized may be dedicated per WTRU. Such RNTI may be dedicated for each WTRU. Signaling similar to PDCCH order may be used to enable the uplink transmission from the WTRU. The WTRU may autonomously determine whether or not it may perform an uplink synchronization request using a RSSC transmission. RSSC occasions and/or resources may be associated to a specific SOM (e.g. including scheduling of concerned resources using a downlink control channel associated with the applicable SOM).

The RSSC may be available independently of the synchronization state and/or scheduling. For example, the WTRU may access this channel and/or resource independently of whether it is in synchronized state or not. The WTRU may be configured to use the RSSC for uplink synchronization. The RSSC may be used in conjunction with normal legacy uplink timing alignment functionality, for example, for a WTRU that is being actively scheduled by the network and/or for a WTRU in RRC CONNECTED mode.

An RSSC may be available for an unsynchronized state (e.g., an RSCC may be unavailable for a synchronized state). For example, the WTRU may access this channel and/or resource when it is in unsynchronized state. For example, the WTRU may use the RSSC when the $TAT_{RSSC}$ is not running (e.g., not when the $TAT_{RSSC}$ is running). The WTRU may use a different signal, such as described herein, when it is in synchronized state (e.g., when the $TAT_{RSSC}$ is running).

In one or more techniques, the WTRU may access this channel and/or resource perhaps for example when (e.g., only when) it might not have valid uplink synchronization and/or perhaps when (e.g., only when) the WTRU may have data available for transmission in the uplink (e.g. using a second transmission method such as described herein). Such data may include a buffer status report (BSR). For example, a WTRU in CONNECTED mode may transmit a BSR (e.g., perhaps only a BSR) on such s channel in which perhaps the procedure may be triggered by new data and/or data of higher priority than data already in the WTRU's buffer becoming available for transmission. For example, a WTRU in IDLE mode may transmit L3/RRC signaling to establishing a new (e.g., fresh) RRC connection, and/or or re-establishing and/or reconnecting a previously existing RRC connection (e.g., perhaps with a BSR—for example perhaps if there is further data available for transmission).

The RSSC may be available when no Dedicated Synchronization Signal (DSS) is configured and/or valid (e.g., RSSC not available when DSS is configured and/or valid). For example, the WTRU may access this channel and/or resource perhaps for example if it determines that it does not have a valid configuration for DSS and/or for example not when it determines that is has a valid DSS configuration. The WTRU may use the RSSC, for example, other means to send a request for uplink synchronization are unavailable. If the WTRU has a valid DSS configuration, the WTRU may use DSS, such as described herein perhaps for example when it is in synchronized state (e.g., when the $TAT_{RSSC}$ is running and/or perhaps if the WTRU might not have data available for transmission).

The WTRUs might not be known to the network to maintain synchronization. Such synchronization channel may be available to any WTRU in a cell, such as actively scheduled WTRUs, inactive WTRUs, and/or WTRUs in IDLE mode.

This channel may also be used to signal that a CB-PUSCH resource may be needed (some form of CB-SR). In such case, the response from the network may include a TAC, power control information (e.g. TPC), a CB-RNTI and/or a grant for an uplink transmission. In other words, a transmission on the RSSC may (re-)activate scheduling CB-PUSCH in a cell. The UE may trigger CB-SR when data becomes available for a specific bearer and/or when the amount of data has specific QoS requirements and/or if the amount of data is below a certain threshold, each of which may be configuration aspects of the WTRU.

The use of a second/different waveform to access CB-PUSCH resources is contemplated. In one or more techniques, such a channel may be a contention-based channel for PUSCH-like transmissions similar to the CB-PUSCH channel. The channel may use a second/different transmission method, for example for the purpose of at least one of: performing a data transmission, obtaining uplink synchronization (e.g. in a downlink transmission containing a TAC), and/or for performing further transmission of data using a first waveform, perhaps for example using an update uplink timing advance determined from a TAC received from the network.

The Dedicated Synchronization Signal (DSS) is contemplated. For example, a WTRU may obtain and/or maintain uplink synchronization using the transmission of a signal on an uplink resource designed for this purpose.

The DSS may be used for maintaining uplink synchronization for WTRUs that might not be actively being scheduled. Such resource may utilize the allocation of resources dedicated to such procedure. The resources might not utilize knowledge of the identity of the WTRU by the network. Such resource may be assigned to a single WTRU. The WTRU may use a transmission on such resource, for example, as a prelude to the use of CB-RNTI grants.

For example, such resource may be available to WTRUs in IDLE mode and to WTRUs in RRC CONNECTED mode in long DRX. A transmission on this resource may be a way to signal that a CB-PUSCH resource may be needed (e.g., CB-SR). The response received from the network may include a TAC, a TPC and/or parameters for CB-PUSCH access, such as CB-RNTI for PDCCH decoding.

For example, the WTRU may obtain and/or maintain uplink synchronization using the transmission of a signal on an uplink resource for the synchronization update procedure.

Synchronization may occur without pro-active actions from the scheduler. The DSS may utilize the allocation of dedicated resources (e.g., such that the network may ensure that no collision occur on this resource). The DSS might not utilize knowledge of the identity of the WTRU by the network. The WTRU may use this resource as a prelude to other types of uplink transmissions using resources requiring uplink timing alignment. Such resource may be accessible to WTRUs in IDLE mode and to WTRUs in RRC CONNECTED mode, including WTRUs in long DRX.

Transmissions on DSS may share similar principles as SRS transmissions. The DSS may be similar in signaling and in configuration to the legacy SRS transmission. For example, the WTRU may obtain and/or maintain uplink synchronization using a physical uplink transmission designed for the synchronization update procedure. A WTRU may perform such transmission in a synchronized state (e.g., not in the unsynchronized state).

The DSS resources used may be dynamically scheduled to control overhead. DSS occasions and/or resources may be semi-statically configured, for example, by dedicated signaling. DSS occasions and/or resources may be dynamically scheduled, for example, using an RNTI. Such RNTI may be common for a subset of, or all, WTRUs in a cell, and one or more (e.g., each) WTRU may be configured with a specific frequency offset and/or signature/sequence for signal generation. For example, the DSS occasion may be common to multiple WTRUs and the resource used may be dedicated per WTRU. Such RNTI may be dedicated for one or more (e.g., each) WTRU. Signaling similar to aperiodic SRS request may be used to enable the uplink transmission from the WTRU. The WTRU may autonomously determine whether or not it may perform an uplink synchronization request using a DSS transmission.

Signaling aspects, such as downlink timing synchronization response, are contemplated. The WTRU may receive a response on PDCCH and/or on PDSCH. For example, the WTRU may receive a response from the network following the transmission of the uplink timing synchronization request. Such request may be a transmission on RSSC, such as described herein, or a signal on DSS, such as described herein. For example, such a response may include a DCI, perhaps received on the PDCCH. For example, the RSSC may use a preamble-like transmission. The WTRU may decode such DCI on PDCCH using, for example, an RNTI that may be calculated as a function of the uplink resource used for the transmission of the request (e.g., using a similar calculation as for RA-RNTI in the random access procedure). This may apply for example, perhaps if the WTRU might not include any data in the request e.g. such as if a preamble, a DSS, and/or similar was used.

RSSC using a second type of transmission, for example with data and with DM-RS is contemplated. Such decoding may be performed using, for example, a RNTI calculated as a function of a DM-RS (e.g. a resource, and/or a pattern thereof) used for the transmission of the request. This may apply in scenarios, perhaps for example including if the WTRU included data in the request (e.g. such as if a second type of transmission, or the like, was used).

RSSC using a second type of transmission, for example with data, is contemplated. For example, the identity of the WTRU may be based on the DM-RS and/or uplink resource that may be used.

Such decoding may be performed using, for example, a configured RNTI for the WTRU (e.g. a C-RNTI perhaps for example if the transmission of the request included capability for the network to determine the identity of the WTRU). For example, the WTRU may be configured to use a WTRU-specific DM-RS and/or the WTRU may use an assigned resource for the transmission. Such resource(s) may be dedicated and/or shared (e.g. a semi-persistent grant which may be used by the WTRU, perhaps if the WTRU has data to transmit). In scenarios including shared resource(s), the WTRU may be configured to use the WTRU-specific DM-RS in such resource(s). This may apply perhaps for example, if the WTRU included data in the request (e.g. such as if a second type of transmission, or the like, was used).

RSSC using a second type of transmission (e.g. with data) is contemplated. The RNTI may be calculated, perhaps for example, based on the resource(s) (e.g. in time and/or frequency used for the uplink transmission).

Such decoding may be performed using, for example, a RNTI that may be calculated as a function of the uplink resource used for the transmission of the request (e.g. in case of a transmission on PUSCH). Such RNTI may be used to decode a DCI using a similar technique as for RA-RNTI, for example. This may apply, perhaps for example if the WTRU included data in the request, such as if a second type of transmission and/or the like, was used on a contention-based channel which may be followed by the reception of a RAR on PDSCH, using such a RNTI value as the RA-RNTI.

The DCI may comprise the TAC and/or TPC. For example, such DCI may comprise at least one of a TAC, power control information (e.g., TPC). Such DCI may comprise a CB-RNTI allocation and/or a grant for an uplink transmission (e.g., a dedicated grant or a contention-based grant depending on whether or not (e.g., respectively) the request that may be used a dedicated resource and/or included capability for the network to determine the identity of the WTRU). The DCI may be applicable, for example, if the resource used for the transmission of the request is dedicated to the WTRU (e.g., the request may have been performed using a DSS, such as described herein, and/or using a dedicated signature or preamble on the RSSC, and/or the included capability for the network to determine the identity of the WTRU as described herein).

The DCI may schedule a RAR-like message on PDSCH that may comprise the TAC and/or TPC. For example, such DCI may comprise a downlink assignment for PDSCH.

The DCI and/or the PDSCH message may include the TAC and/or TPC for a WTRU. The downlink transmission on PDSCH may include an L2 message, for example, similar to the RAR used in the random access procedure. Such L2 message may comprise a TAC and/or power control information (e.g., TPC). The L2 message may comprise a CB-RNTI and/or a grant for an uplink transmission (e.g., a contention-based grant). Such DCI may be applicable, for example, if the resource used for the transmission of the request is shared for multiple WTRUs (e.g., the request may have been performed using a randomly selected preamble on RSSC). For example, such WTRU-specific L2 message may be utilized as response to the transmission of an uplink synchronization request using dedicated resources for RSSC or using DSS.

The DCI and/or the PDSCH message may comprise a DSS configuration for a WTRU. The downlink transmission on PDSCH may comprise a L2 message, for example, similar to the RAR used in the random access procedure. Such L2 message may comprise a configuration for DSS (e.g., as described herein). The WTRU may configure the uplink synchronization procedure such that DSS transmissions may be used when the WTRU is synchronized for the WTRU-autonomous uplink synchronization procedure. When the response is related to the previous transmission on RSSC, the WTRU may receive the DSS as initial configuration. When the response may be related to a previous transmission on DSS, such DSS configuration may be useful. The DSS configuration may be present when the WTRU may be reallocated to a new set of resource. For example, the DSS configuration may be valid until revoked (e.g., explicitly revoked). For example, the WTRU may invalidate and/or remove the DSS configuration when it may no longer be synchronized to the cell, such as when the TAT expires (e.g., this may provide control to the network to let the resources expire) and/or when a mobility event occurs. For example, the WTRU may invalidate and/or remove the DSS configuration when it initiates a transmission on the RSSC (e.g., such as described herein).

The DCI and/or the PDSCH message may comprise the TAC and/or TPC for multiple WTRUs. Such message may comprise multiple responses. For example, one or more (e.g., each) response may comprise an identifier, such as the preamble received. Such message may comprise a backoff indicator, for example, a WTRU may have transmitted a synchronization request and may have received a L2 message associated with the resource used for the transmission, which message might not comprise a response for the concerned WTRU. For example, the WTRU may determine that the backoff indicator may be set and may determine an amount of time it is utilized to wait before a subsequent attempt (e.g., or retransmission) may be performed. For example, such multi-WTRU L2 message may be suitable as a response to the transmission of an uplink synchronization request using shared or dedicated resources for RSSC. It may be applicable as response to uplink synchronization request using dedicated resources for DSS if one or more (e.g., each) WTRU may be associated with some index inside the response, for example, based on the resource used.

The WTRU may receive HARQ feedback, for example in scenarios including where there was data in the request. For example, the WTRU may receive HARQ feedback associated to the transmission of such a request, for example, perhaps if the WTRU used a transmission corresponding to a data transmission (e.g. a transmission on a PUSCH resource), among other scenarios. The HARQ feedback may be received according to procedure(s) applicable for such transmission (e.g. using PHICH and/or PDCCH). In scenarios involving PDCCH, the RNTI used may be determined according to one of the procedure described herein.

For a request with data, the WTRU may try again, perhaps if it receives HARQ NACK (for example perhaps only if it receives HARQ/NACK). The WTRU may (e.g., autonomously) perform a further transmission (e.g. according to a method used for the request as described herein) perhaps for example if the WTRU receives HARQ NACK but might not receive any other response to the request, and/or might not obtain valid uplink timing synchronization (e.g., perhaps as a result of the transmission of the request). The further transmission may be a HARQ retransmission, perhaps for example if the transmission for which HARQ NACK feedback was received was not performed on a contention-based resource.

No response, power ramp-up and/or determining failure (e.g. RLF after x attempts) are contemplated. The WTRU may determine that no response is received for the request. The WTRU may perform the determination, perhaps for example after a certain time has elapsed since the last transmission of a request. The WTRU may determine that no HARQ feedback is received for such last transmission. In such scenarios, among others, the WTRU may perform power ramping for the next attempt, if any, for example. Ramping up to a maximum transmission power may be a configurable aspect of the WTRU. A last/previous transmission may be the last/most previous attempt in a sequence of one or more attempts. A maximum number of attempts may be a configurable aspect of the WTRU. The WTRU may determine that the procedure is unsuccessful, perhaps for example when it determines that no response has been received and/or the maximum number of attempts has been reached. In such scenarios, among others, the WTRU may revert to legacy procedures (e.g. random access, Radio Link Failure in CONNECTED mode, and/or cell reselection in IDLE mode).

Examples of improved access to uplink resources are contemplated. Enhanced Scheduling Request (eSR) is contemplated. The WTRU may send more detailed information about what it utilizes to transmit in the scheduling request, for example, instead of providing the information in the BSR, or in an extended BSR (eBSR), for example, on CB-PUSCH. This may provide reduction of the overall UP latency at the expense of SR resource consumption. This may be attractive in small cell scenarios, such as where PUCCH multiplexing capacity may be higher and fewer WTRUs may be connected. Examples described herein may be well suited for high load environments. The WTRU may transmit an enhanced scheduling request (eSR) that includes at least the following information: amount of data available for transmission, and/or priority of such data; delay requirement of data available for transmission; other QoS aspects; channel-related info (e.g., CQI, pathloss, PHR, etc.); and/or WTRU identity.

The amount of data available for transmission, and/or priority of such data, for example, may include similar information as the legacy BSR. For example, the WTRU may report an amount of data at a different (e.g., lower) granularity. For example, the priority signaled (e.g., either implicitly, such as for the amount of data reported when a specific priority is reported, or explicitly) may be for one or more (e.g., each) amount of data reported (e.g., when one amount for different priorities may be reported). The priority signaled may be the priority associated with the data that has the highest priority in the WTRU's buffer.

The WTRU may transmit an enhanced scheduling request comprising the delay requirement of data available for transmission. For example, the WTRU may report the amount of data that may have a delay requirement less than a threshold. For example, the WTRU may report the delay requirement of the data that may have the most stringent delay requirement. For example, the data considered may correspond to data associated to a specific priority.

The WTRU may transmit an enhanced scheduling request comprising other QoS aspects, for example similar to those described herein.

The WTRU may transmit an enhanced scheduling request comprising channel-related info (CQI, pathloss, PHR, etc.). For example, the WTRU may report information such that the network may determine the most suitable grant for the WTRU, or "desired" grant parameters (e.g., MCS, RB allocation, rank).

The WTRU may transmit an enhanced scheduling request comprising the WTRU identity, for example, for shared resource for E-SR.

The WTRU may transmit an enhanced scheduling request (eSR) according to channel selection over PUCCH or over RACH preambles (e.g., two resources may be used to provide one bit of information, four resources to provide two bits of information, etc.). The WTRU may transmit an enhanced scheduling request (eSR) according to PUCCH format 2 or format 3 and the number of information bits may be set by the signaling format use, for example, the PUCCH format 2b may provide up to two bits of information. The WTRU may transmit an enhanced scheduling request (eSR) according to PUSCH (e.g., contention-based) and the number of information bits may be set by the signaling format used.

The WTRU may initiate the transmission of an enhanced scheduling request (eSR) according to UL data arrival, such as for specific bearers. The WTRU may initiate the transmission of an enhanced scheduling request (eSR) that may be valid for a single eSR transmission, for example, if the WTRU has received L1/MAC signaling enabling the functionality. Signaling that may comprise indication of eSR resource to use (e.g., that allows the network to configure >1 UE on same eSR resource without collision). The WTRU may initiate the transmission of an enhanced scheduling request, for example, if a WTRU has received PDCCH/E-PDCCH/PDSCH within a time period. The DCI may contain indication of eSR resource to use (e.g., to enable more accurate pre-allocation scheme).

The use of eSR may be a configuration aspect. Such SR combined with information (eSR) may be similar to Happy Bit(s). The transmission of a signal may correspond to the eSR (e.g., 1 bit of information), and the signal may convey information (e.g., two bits total information). Happy bits (e.g., the second bit of information and the resulting 2-bit codepoints) may be applicable, for example, when eSR may be configured and/or available. eSR may be applicable to one or a subset of bearers in the WTRU's configuration. For example, the happy bits may signal information related to a single LCG and/or DRB or to the aggregation of a plurality of LCGs and/or DRBs configured with eSR.

For example, the WTRU may comprise any information described herein, for example, on a transmission on PUSCH (e.g., CB-PUSCH), such that the information may be transmitted as a MAC Control Element in an extended BSR (e.g., MAC eBSR CE).

Contention-based uplink resources are contemplated. Combinations of RSSC and DSS are contemplated. Additional combinations of examples that enable CB-PUSCH transmissions are contemplated.

For example, the WTRU may perform a transmission on CB-PUSCH. For example, the WTRU may perform a transmission on a different channel (e.g., PRACH, RSSC) or using a different signal (e.g., DSS, SRS, PUCCH) for resolving contention. If the WTRU may have a valid DSS configuration, and/or if such resource may be dedicated to the WTRU, the WTRU may access the CB-PUSCH channel and transmit data in the uplink while performing a DSS transmission. The network may determine the WTRUs that may have performed the uplink transmission or determine whether or not a collision may have occurred on the CB-PUSCH.

The WTRU may use a WTRU-specific DM-RS resource and/or pattern on CB-PUSCH. The WTRU may perform a transmission on. CB-PUSCH using (e.g., second) transmission methods (e.g. non-orthogonal transmission and/or using a waveform that does not have tight synchronization requirement). Such a transmission may be performed using a configured grant and/or resource, for example, in which the WTRU may perform an uplink transmission perhaps if there is data to transmit (e.g., perhaps only if there is data to transmit), and/or if the WTRU determines that it may initiate the uplink synchronization request procedure as described herein.

Pre-allocation is contemplated. The WTRU may determine the grant parameters, for example, without receiving a dynamic grant. This may allow the WTRU to start PHY processing, for example, as soon as the data may be received instead of waiting for a DCI. The WTRU may pick from more than one set of parameters and an indication may be provided to ease blind decoding. To enable contention, the WTRU may use a small dedicated resource (e.g., PUCCH, SR) to indicate that it may be transmitting or going to transmit, and on which resource.

The PDCCH order for CFRA may be an opportunity for the WTRU to perform SR+TA using a resource allocated, for example, using a dedicated grant (e.g., instead of a contention-based grant). Dynamic scheduling of PRACH resources for RA-SR may be used, for example, dynamic scheduling of PRACH resources for RA-SR may be performed for WTRUs with dedicated preambles but not for WTRUs with non-dedicated preambles.

The WTRU may perform autonomous selection and/or determination for at least one of the following parameters associated to a grant: MCS; RB allocation; rank; bundling with number of repetitions (e.g., to address power limitations/cell edge); max HARQ (e.g., to address power limitations/cell edge); power (e.g., may use same formula with specific offset to compensate for the lack of power accuracy when the WTRU might not have transmitted for a long time); etc. The WTRU may determine such parameters according to at least one of the following: the amount of buffered data, for example, from a high-priority logical channel; the channel-related info (e.g., CQI, pathloss, PHR, etc.), such as something that depends on link quality.

For parameters for which the WTRU has autonomously determined a value, the WTRU may signal together with the transmission such that the WTRU may comprise the index to grant/resource parameters and/or the WTRU identity. For parameters for which the WTRU has autonomously determined a value, the WTRU may signal together with the transmission in PUSCH, for example using puncturing (e.g., similar to RI or A/N, possibly in place of RI or A/N). For parameters for which the WTRU has autonomously determined a value, the WTRU may signal together with the transmission in (e.g., dedicated) PUCCH resource and may or might not be in same subframe.

The WTRU may use such examples when at least one of the following occurs: UL data arrival; if pre-defined grant resource may be available before N subframes (e.g., or if it allows for reduced latency considering timing of regular SR resource); if the WTRU has received L1/MAC signaling enabling the functionality (e.g., signaling may comprise a set of possible resources and grant parameters and resource for associated signaling); and/or if the WTRU has received PDCCH/E-PDCCH/PDSCH within a time period.

Combinations of RSSC, DSS, L3 Connection Reactivation, extended Paging, and eSR are described herein.

Figure 6:
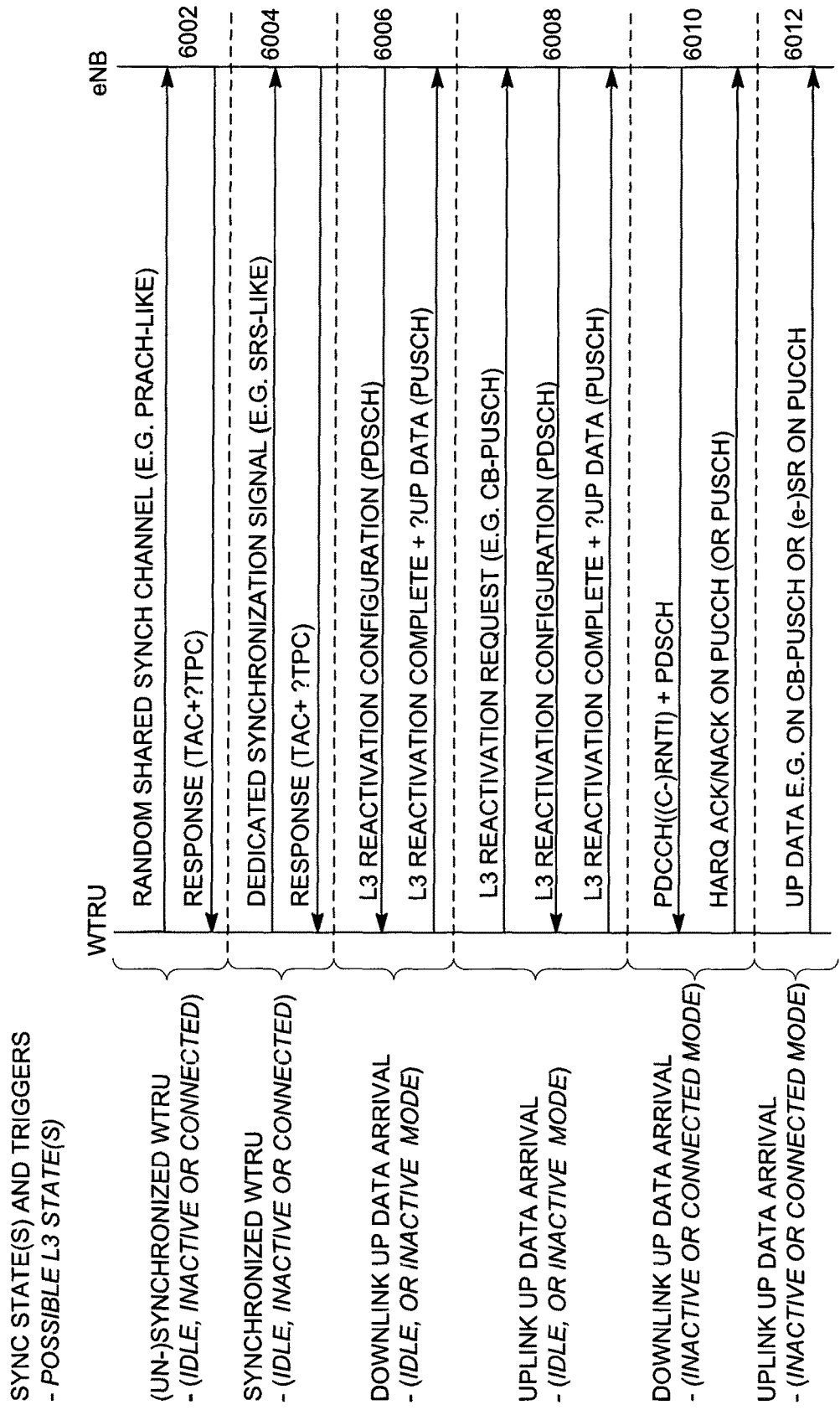
FIG. 6 is an example of signaling for RSSC, DSS, L3 Connection Reactivation, extended paging, and eSR.

FIG. 6 shows examples of signaling that may be used. For example, different combinations of RSSC, DSS, L3 Connection Reactivation, extended paging, and/or eSR may be used.

The techniques described for the use of RSSC, DSS, L3 Connection Reactivation, extended paging, and/or eSR may be applicable to any mode of operation, any trigger to perform autonomous uplink synchronization, and/or any transitions from an unsynchronized to synchronized state. The RSSC transmission, use of dedicated synchronization signals, Layer 3/RRC reactivation, and/or techniques for Downlink or Uplink UP data arrival be performed individually or in any combination.

An example, at 6002 in FIG. 6, a request for initial synchronization may be transmitted. For example, the WTRU may determine that it does not have a valid/up-to-date/accurate uplink synchronization. The WTRU may determine that resources for autonomously maintaining uplink synchronization are available in the cell. If the WTRU has data available for transmission and/or the WTRU is configured with a second transmission method (e.g., the second transmission method may be performed even when the WTRU does not have uplink synchronization), such as a second transmission method on a CB-PUSCH channel, e.g., the WTRU may perform a transmission in accordance with the second transmission method. For example, a transmission on the CB-PUSCH or other resources associated with the second transmission method may be self-contained (e.g., the network may be able determine the identity of the WTRU from the successful reception of the transmission). If the WTRU determines that it should obtain uplink synchronization prior to uplink transmission (e.g., the WTRU determines it is configured to autonomously maintain valid uplink timing alignment), the WTRU may initiate the uplink synchronization procedure by transmitting a preamble on the RSSC.

The WTRU may perform various action if an attempt to obtain uplink synchronization on the RSSC is unsuccessful. For example, in the absence of a response to the RSSC transmission (e.g., the absence of a response within a specific time following the transmission of a preamble or other event related to the RSSC transmission), the WTRU may apply some backoff time and/or may perform a retransmission for example after the backoff time has elapsed. For example, the re-transmission on the RSSC may be performed with increased transmission power. In the absence of a response (e.g., absence of a response within a certain number of transmissions or retransmissions), the WTRU may determine that the procedure is unsuccessful and attempt to send a scheduling request using a random access channel (e.g., revert to the legacy RA-SR procedure)

Also shown at 6002 in FIG. 6 is a response to the RSSC request and/or the transmission using the second transmission method (e.g., the transmission method where the WTRU transmits without uplink synchronization). The response may include initial synchronization information. For example, the WTRU may receive a Timing Advance Command (TAC). The WTRU may receive a power control command (TPC), e.g., to determine the initial transmission power for subsequent transmissions. Initial transmission power may remain valid, e.g., as long as the pathloss estimate criterion (e.g., pathloss estimate criterion as described for determining if DL timing has changed) is not met (e.g., as long as the pathloss estimate change does not change by more than a specific threshold subsequent to the reception of such TPC).

Once the WTRU has obtained an initial uplink timing alignment/synchronization, the WTRU may maintain valid uplink timing alignment according to any example described herein (e.g., by RSSC, DSS, random access, etc.).

Synchronization may be maintained by the WTRU while operating in any mode or based on any synchronization trigger by using the RSSC. 6004 in FIG. 6 illustrates the WTRU maintaining synchronization. For example, the WTRU may determine that it currently has valid uplink synchronization. The WTRU may determine that it is configured to autonomously maintain the valid uplink timing alignment. The WTRU may determine that resources for autonomously maintaining uplink synchronization may be available in the cell. Perhaps for example, if the WTRU has data available for transmission and/or the WTRU is configured with a second/different transmission method for transmission on a CB-PUSCH channel, e.g., the WTRU may perform such transmission. Perhaps for example if the WTRU determines that is may have lost uplink synchronization (e.g. the WTRU determines that the downlink timing reference has changed by more than a configured threshold since it last received a TAC), the WTRU may initiate the uplink synchronization procedure by transmitting a preamble on the RSSC.

The WTRU may determine that the attempt to maintain uplink synchronization using the RSSC was unsuccessful. For example, in the absence of a response within a time (e.g., a specific time following the transmission of a preamble), the WTRU may apply some backoff time and/or perform a retransmission, e.g., with increased transmission power. In the absence of a response within a certain number of retransmissions, the WTRU may determine that the procedure is unsuccessful and/or revert to, e.g., the legacy RA-SR procedure when triggered using legacy methods.

As shown at 6004 in FIG. 6, the WTRU may receive a response, for maintaining the (e.g., initial) synchronization. The WTRU may receive a Timing Advance Command (TAC). The WTRU may receive a power control command (TPC) (e.g., to determine the initial transmission power for subsequent transmissions). Initial transmission power may remain valid, for example, as long as the pathloss estimate criterion or other criteria for determining a relative change in DL timing is not present (e.g., as long as the pathloss estimate change does not change by more than a specific threshold subsequent to the reception of such TPC).

The WTRU may subsequently maintain valid uplink timing alignment, e.g., according to an example described herein (e.g., by DSS).

Synchronization may be maintained by the WTRU while operating in any mode or based on any synchronization trigger by using the DSS. For example, as shown at 6004 of FIG. 6, the WTRU may determine that it has valid uplink synchronization. The WTRU may determine that it is configured to autonomously maintain valid uplink timing alignment using a dedicated transmission (e.g., via DSS), for example using an SRS-like signal on a dedicated resource in time-frequency domain. The WTRU may determine that it has a valid transmission power setting for the uplink transmission. If The WTRU determines it does not have valid synchronization, the WTRU may revert to a transmission on RSSC, as described herein. If the WTRU has data available for transmission, and/or the WTRU is configured with a second transmission method for transmission on a CB-PUSCH channel, e.g., the WTRU may perform such transmission. If the WTRU determines that its synchronization state may have changed (e.g., the WTRU determines that the downlink timing reference has changed, such as changing by more than a configured threshold since it last received a TAC), the WTRU may initiate the uplink synchronization procedure by transmitting a signal on the dedicated resource.

The WTRU may determine that the attempt to maintain uplink synchronization using the DSS was unsuccessful. For example, the WTRU might not receive a response within a specific time following the transmission on a dedicated resource. If the WTRU does not receive a response within a specific time following the transmission on a dedicated resource, the WTRU may perform a retransmission at a subsequent occasion. The WTRU may determine that the attempt to maintain uplink synchronization using the DSS is unsuccessful (e.g., in the absence of a response within a certain number of re-transmissions. If the WTRU determines that the attempt to maintain uplink synchronization using the DSS is unsuccessful, the WTRU may revert to a transmission (e.g., on RSSC) as described herein, or to the legacy RA-SR procedure when triggered using legacy methods.

As shown in 6004 in FIG. 6 the WTRU may receive a response, for initial synchronization. The WTRU may receive a Timing Advance Command (TAC). For example, the WTRU may receive a power control command (TPC) to determine the initial transmission power for subsequent transmissions. The initial transmission power may remain valid e.g., as long as the pathloss estimate criterion is not met (e.g., as long as the pathloss estimate change does not change by more than a threshold subsequent to the reception of such TPC).

The WTRU may maintain valid uplink timing alignment, e.g., according to an example described herein (e.g., by RSSC).

Figure 7:
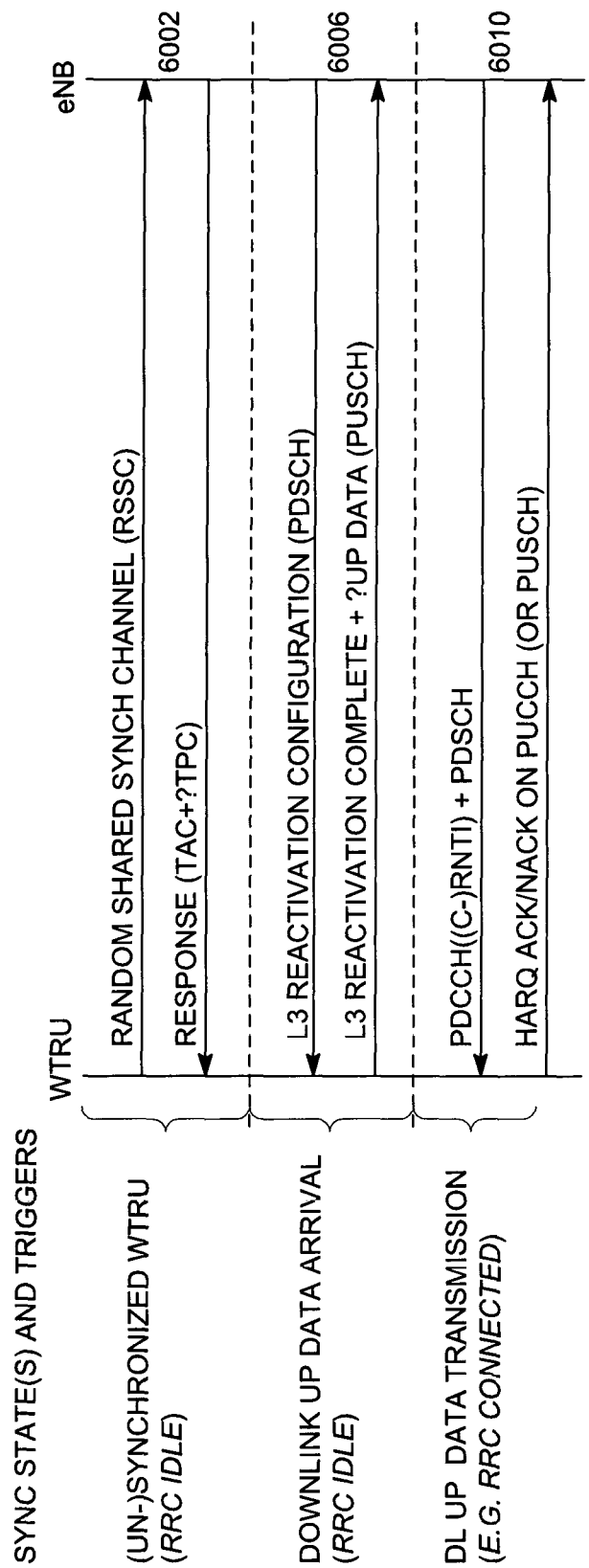
FIG. 7 is an example of signaling for NW-initiated L3 Reactivation in RRC Idle state.

The WTRU may be configured to handle Downlink Data Arrival while operating in IDLE mode. FIG. 7 shows an example of signalling techniques described herein for a WTRU in IDLE mode in case of downlink data arrival (e.g., with L3 Connection Reactivation).

For example, to process downlink data arrival while operating in IDLE mode the WTRU may or might not be synchronized. If the WTRU is in RRC IDLE mode and/or it does not have valid uplink timing alignment (e.g., the WTRU is not synchronized), the WTRU may autonomously initiate the transition from unsynchronized to synchronized (e.g., as described herein, and/or corresponding to 6002 in FIG. 6/FIG. 7).

The WTRU may initiate an autonomous synchronization procedure as described herein which may allow it to process data faster than legacy behaviour. For example, if the WTRU performs autonomous UL timing alignment (e.g., via the RSSC), and if the WTRU received extended paging that schedules a transmission (e.g., downlink and/or uplink) the WTRU may be able to process the transmission quickly. For example, the WTRU may determine which synchronization procedure (e.g., autonomous using RSSC/DSS or legacy using RACH) the WTRU may be able to complete the fastest and/or select the faster procedure for performing the synchronization. For example, if the initial page includes scheduling information and the WTRU determines that the autonomous timing synchronization procedure can be completed in time to perform the transmission in accordance with the received scheduling information, then the WTRU may initiate the autonomous timing synchronization procedure. If the WTRU determines that it cannot complete the autonomous timing procedure and/or such a procedure is unsuccessful, the WTRU may perform legacy procedure(s) for the applicable mode of operation (e.g. such as RRC IDLE mode procedures), such as the legacy RRC Connection Establishment Request procedure (e.g., such as initiating the random access procedure on PRACH resources of the cell).

The WTRU may receive control signalling that indicates a PDSCH transmission that includes RRC Reactivation and/or configuration information. For example, the WTRU may receive control signalling in the downlink that may indicate a downlink transmission on PDSCH for the WTRU. Such control signalling may, e.g., be extended paging signalling, as described herein. The WTRU may receive the PDSCH transmission. The PDSCH transmission may, e.g., include user plane data for the WTRU (e.g. for short data transfer) and/or control plane signalling (e.g., L3 signalling) that configures a connection. L3 signalling may include a RRC Connection Reconfiguration message (e.g., that reactivates and/or re-configures a RRC Connection, for example such as a reactivation of a previously used RRC Connection and/or RRC context).

WTRU may transmit a response to indicate completion of RRC Connection configuration. The WTRU may, e.g., once it has successfully reactivated and/or re-configured the RRC Connection, initiate the transmission of a response, such as a RRC Connection Reconfiguration Complete message.

For example, the WTRU may be configured to set a priority among signalling procedures such that WTRU first checks for dedicated grants (e.g., paging or PDCCH), then processes a CB-PUSCH if available, and then reverts to use of the RACH. In other examples, such procedures may be performed contemporaneously or in a different order.

For example, the WTRU may determine whether or not a grant for a dedicated transmission on the PUSCH was received, e.g., in the extended paging signalling. If a dedicated grant is received, the WTRU may transmit a response using the associated resources. For example, the WTRU may decode DCIs on PDCCH for a certain period of time using the C-RNTI associated with the (e.g., possibly re-activated) RRC Connection as configured and/or established from the reception of the L3 signalling. For example, the WTRU may decode DCIs on PDCCH for a certain period of time using the C-RNTI associated with the RRC Connection if a grant for a dedicated transmission on PUSCH was not received. The WTRU may, e.g., if the WTRU successfully decodes such grant, transmit the response using the associated resources. If the WTRU does not successfully receive a grant (e.g., within a possibly configured period), the WTRU may initiate the random access procedure on PRACH resources of the cell. Rather than or in addition to initiating random access, the WTRU may determine whether there is a CB-PUSCH resource available to the WTRU (e.g., possibly within a certain amount of time).

The WTRU may, e.g., if the CB-PUSCH resource is available, transmit the response using the associated resources. Perhaps for example if the WTRU does not identify a suitable resource for a PUSCH transmission for the L3 response, and/or if the WTRU determines that the transmission using the determined resource is unsuccessful, the WTRU may initiate the random access procedure on PRACH resources of the cell for the reactivated and/or established RRC Connection. Subsequently or in parallel, the WTRU may perform legacy procedure(s) for the applicable mode of operation (e.g., such as RRC IDLE mode procedures) such as the legacy RRC Connection Establishment Request procedure (e.g., which may also involve initiating the random access procedure on PRACH resources of the cell).

An example of the L3 signalling is shown in at 6006 in FIG. 6/FIG. 7. This may apply to the RRC-Inactive mode, if such a mode is supported by the WTRU.

In one or more techniques, 6002 may be performed as part of 6006, perhaps instead of the WTRU's transmission of the L3 Reactivation Complete message and/or the first user plane data, perhaps for example if a second type of transmission may be used for the RSSC such that data may be included on the transmission for the RSSC, for example.

Figure 8:
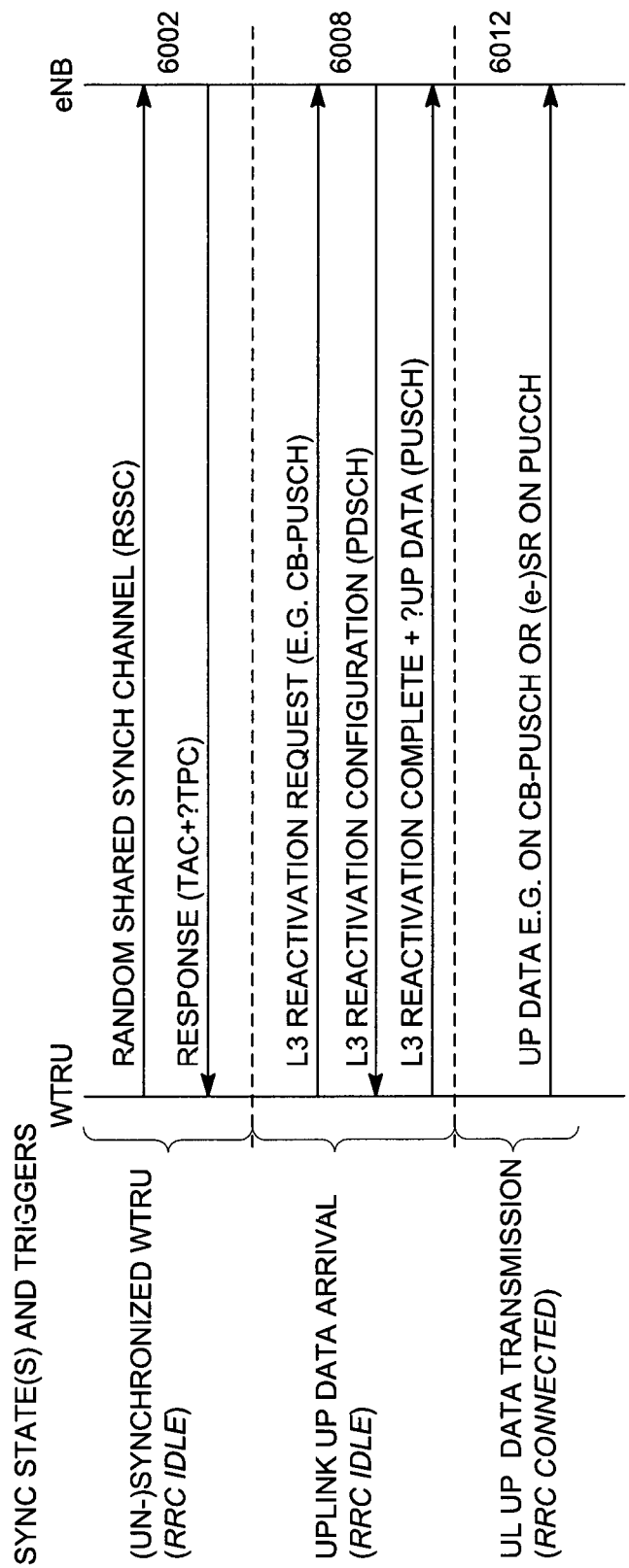
FIG. 8 is an example of signaling for WTRU-initiated L3 Reactivation in RRC Idle state.

The WTRU may be configured to handle Uplink Data Arrival while operating in IDLE mode. FIG. 8 shows an example of signalling techniques described herein for a WTRU in IDLE mode in case of uplink data arrival (e.g. with L3 Connection Reactivation).

The WTRU may autonomously initiate the transition from unsynchronized to synchronized. For example, the WTRU may autonomously initiate the transition from unsynchronized to synchronized as described herein and/or shown in 6002 of FIG. 6/FIG. 8. The WTRU may autonomously initiate the transition from unsynchronized to synchronized, perhaps for example if the WTRU is in RRC IDLE mode and/or the WTRU does not have valid uplink timing alignment (e.g., the WTRU is not synchronized).

For example, the WTRU may initiate synchronization, perhaps for example if it can be faster than legacy behaviour (e.g., if the WTRU is in RRC IDLE mode and/or the WTRU does have valid uplink timing alignment), among other scenarios.

The WTRU may initiate synchronization if the WTRU determines that CB-PUSCH resources are available (e.g., if the WTRU determines that the WTRU may complete the synchronization procedure on time for a required uplink transmission, e.g., on (CB-) PUSCH). The WTRU may perform legacy procedure(s) for the applicable mode of operation (e.g., such as RRC IDLE mode procedures) such as the legacy RRC Connection Establishment Request procedure. For example, the WTRU may perform legacy procedure(s) for the applicable mode of operation if the WTRU might not complete the synchronization procedure on time for a required uplink transmission.

The WTRU may initiate transmission of L3 control signalling. The WTRU may initiate the transmission of data. Such data may include user plane data (e.g., a small data transfer). Such data may be control plane signalling (e.g., L3 signalling) that may request the establishment and/or the reactivation of a connection. Such L3 signalling, may include a RRC Connection Establishment (or Re-establishment) Request message, for example, that requests a re-configuration and/or a reactivation of a RRC Connection (e.g. such as a reactivation of a previously used RRC Connection and/or RRC context).

A check for CB-PUSCH, and/or RACH, is contemplated. At 6008, the WTRU may determine whether there is a CB-PUSCH resource available to the WTRU (e.g., possibly within a certain amount of time). This determination of a CB-PUSCH resource may be performed first. Perhaps for example, if such a resource is available, the WTRU may transmit the data using the associated resources. Perhaps for example if the WTRU does not determine a suitable resource for a PUSCH transmission for the data, and/or if the WTRU determines that the transmission using the determined resource is unsuccessful, the WTRU may perform legacy procedure(s) for the applicable mode of operation (e.g., such as RRC IDLE mode procedures) such as the legacy RRC Connection Establishment Request procedure, e.g., which may involve initiating the random access procedure on PRACH resources of the cell.

The WTRU may receive a L3 response. The WTRU may receive control signalling in the downlink that indicates (e.g., a downlink transmission on PDSCH for the WTRU). The WTRU may decode DCIs on PDCCH for a certain period of time using the C-RNTI associated to the RRC Connection associated to the re-activation request (if applicable). If the WTRU successfully decodes such downlink assignment, the WTRU may receive a transmission on the PDSCH. The PDSCH transmission may include, e.g., user plane data for the WTRU (e.g. for short data transfer) and/or control plane signalling (e.g. L3 signalling) that configures a connection. Such L3 signalling may, e.g., include a RRC Connection Reconfiguration message that, e.g., reactivates and/or re-configures a RRC Connection, such as a reactivation of a previously used RRC Connection and/or RRC context, e.g., using the connection associated to the request previously sent by the WTRU.

A WTRU may transmit a response, e.g., to indicate completion of RRC Connection configuration The WTRU may (for example perhaps once it has successfully received L3 signalling and/or reactivated and/or re-configured the RRC Connection) initiate the transmission of a response, such as a RRC Connection Reconfiguration Complete message.

The WTRU may check for dedicated grant (PDCCH), and/or CB-PUSCH, and/or RACH.

The WTRU may determine whether a grant for a dedicated transmission on PUSCH is available, e.g. by decoding PDCCH possibly during a certain amount of time for a DCI that includes a grant for an uplink transmission using the C-RNTI associated to the (possibly re-activated) RRC Connection as configured and/or established from the reception of the L3 signalling. For example, the WTRU may perform this determination first, among other scenarios. The WTRU may transmit the response using the associated resources, e.g., if the WTRU determines that a grant for a dedicated transmission on PUSCH is available. The WTRU may, e.g., if the WTRU determines that a grant for a dedicated transmission on PUSCH is not available, initiate the random access procedure on PRACH resources of the cell. The WTRU may determine whether there is a CB-PUSCH resource available to the WTRU (e.g., possibly within a certain amount of time). The WTRU may, e.g., if such resource is available, transmit the response using the associated resources. The WTRU may, e.g., if the WTRU does not determine a suitable resource for a PUSCH transmission for the L3 response, perform legacy procedure(s) for the applicable mode of operation (e.g. such as RRC IDLE mode procedures) such as the legacy RRC Connection Establishment Request procedure, e.g. which may also involve initiating the random access procedure on PRACH resources of the cell.

The WTRU might not receive any L3 response. The WTRU may, perhaps for example if the WTRU might not successfully receive a transmission on PDSCH, perform legacy procedure(s) for the applicable mode of operation (e.g., such as RRC IDLE mode procedures), such as the legacy RRC Connection Establishment Request procedure, which may involve initiating the random access procedure on PRACH resources of the cell.

Such signalling is shown at 6006 in FIG. 6/FIG. 8. This may apply to the RRC-Inactive mode (e.g., if such a mode is supported by the WTRU).

For example, 6002 may be used for the WTRU's transmission of the L3 Reactivation Request message and/or the first user plane data, perhaps for example if a second type of transmission may be used for the RSSC such that data may be included on the transmission for the RSSC.

Figure 9:
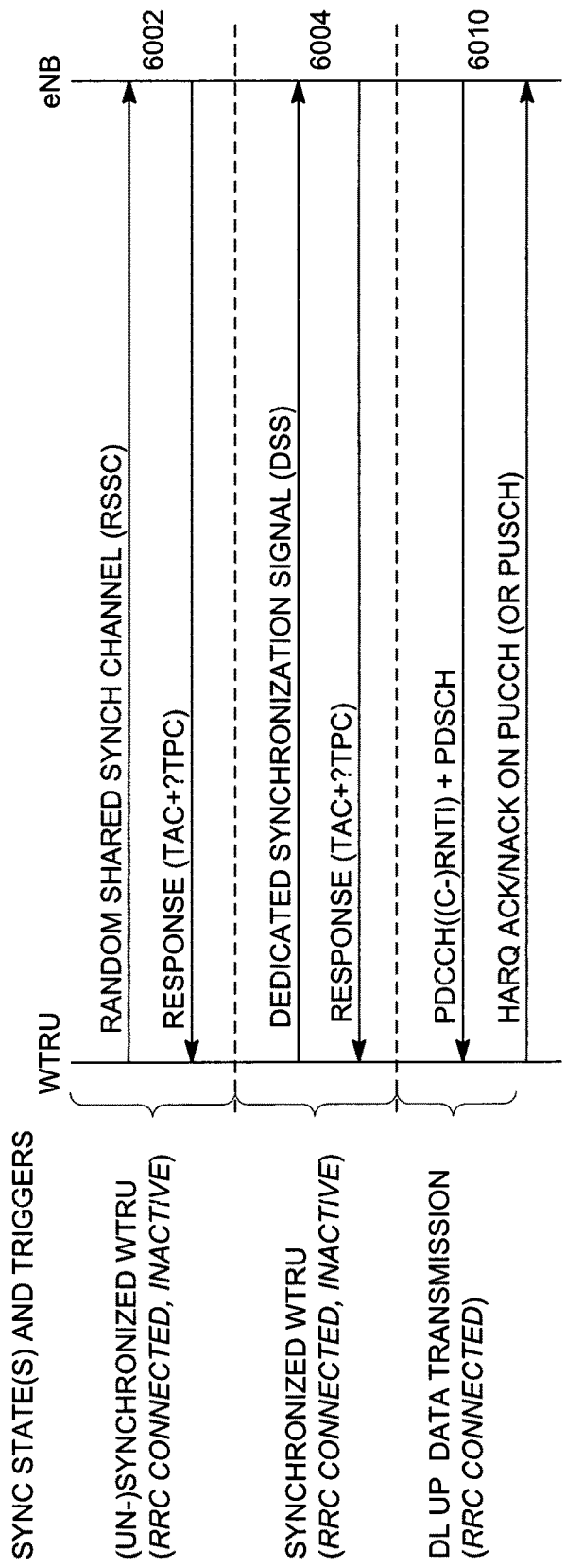
FIG. 9 is an example of signaling for Downlink Data Arrival in RRC Connected state.

Connected mode and/or downlink data arrival is contemplated. FIG. 9 shows an example of signalling techniques of the methods described herein for a WTRU in CONNECTED mode in case of downlink data arrival.

Perhaps for example if the WTRU is in RCC CONNECTED mode and/or does not have valid uplink timing alignment (e.g., the WTRU is not synchronized), the WTRU may autonomously initiate the transition from unsynchronized to synchronized (e.g., as described in herein and corresponding to 6002 in FIG. 6/FIG. 9.

The WTRU may receive DCI on PDCCH for reception of PDSCH. The WTRU may receive control signalling on PDCCH that may indicate a downlink transmission on PDSCH for the WTRU. In such scenarios, among others, the WTRU may transmit HARQ ACK/NACK signalling for the received transmission, perhaps for example when it (e.g., autonomously) maintains uplink timing alignment.

The handling of error cases, such as a mismatch between network (NW) and the WTRU is contemplated. Perhaps for example if the WTRU might not have a valid uplink timing alignment, the WTRU may initiate the random access procedure on PRACH resources of the cell, for example such that it may obtain uplink timing alignment. This may enable the NW to detect the error case, for example where the NW may have assumed (e.g. incorrectly) that the WTRU was successful in autonomously maintaining valid uplink timing alignment, and/or the NW may restart the transmission of the downlink data. Example signalling is shown at 6010 in FIG. 6/FIG. 9. This may apply to the RRC-Inactive mode, if such a mode is supported by the WTRU.

Figure 10:
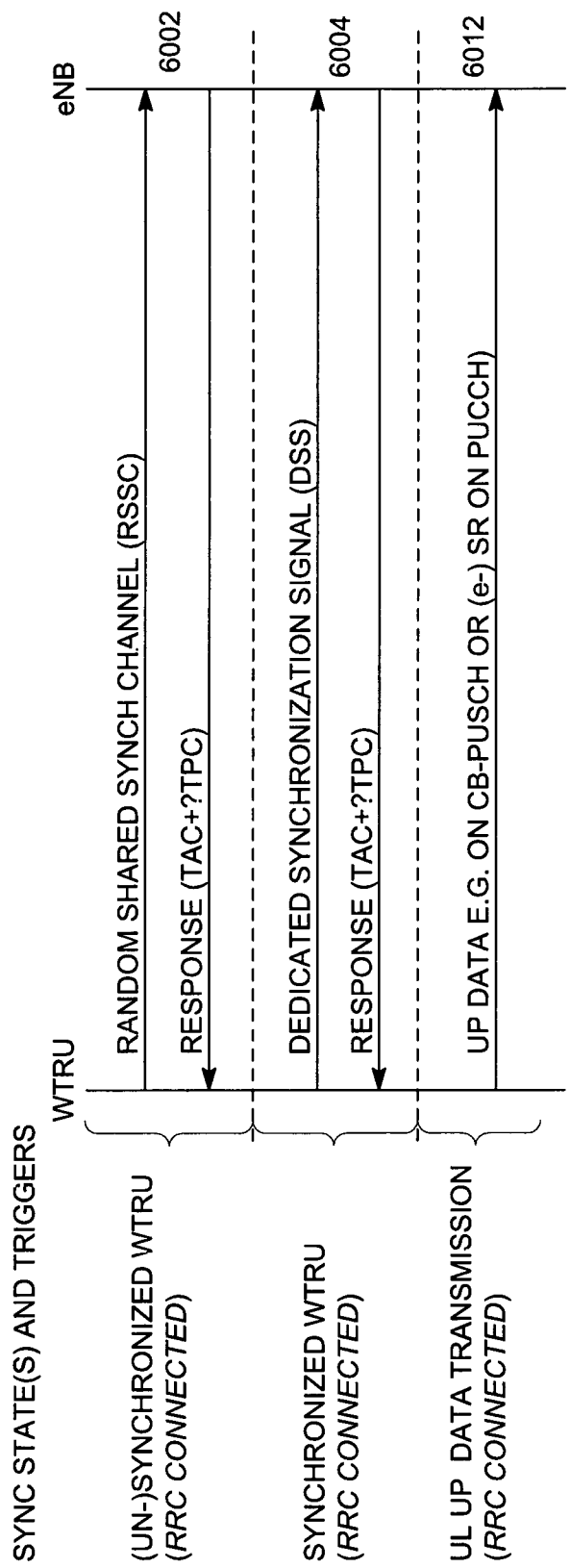
FIG. 10 is an example of signaling for Uplink Data Arrival in RRC Connected state.

Connected mode and/or Uplink Data Arrival, is contemplated. FIG. 10 shows an example of signalling techniques described herein for a WTRU in CONNECTED mode in case of uplink data arrival.

The WTRU may or might not be synchronized. Perhaps for example, if the WTRU is in RCC CONNECTED mode and/or does not have valid uplink timing alignment (e.g., the WTRU is not synchronized), the WTRU may autonomously initiate the transition from unsynchronized to synchronized, e.g., as described herein and/or corresponding to 6002 in FIG. 6/FIG. 10.

The WTRU may determine that it has new (e.g., fresh) data available for transmission. For example, the new data available for transmission may include data associated with a (e.g., specific by configuration) Data Radio Bearer (DRB). The determination of whether the WTRU has new data available for transmission might not be applicable to higher priority transmissions (e.g., to data associated with a Signalling Radio Bearer (SRB)).

The WTRU may check for CB-PUSCH, and/or RACH. The WTRU may for example determine whether there is a CB-PUSCH resource available to the WTRU (e.g., within a certain amount of time). For example, the WTRU may make this determination first. The WTRU may (e.g., if the CB-PUSCH resource is available) transmit the data using the associated resources. The WTRU may (e.g. if the WTRU does not determine a suitable resource for a PUSCH transmission for the data and/or if the WTRU determines that the transmission using the determined resource is unsuccessful) perform legacy procedure(s) for the applicable mode of operation. The WTRU may use a Scheduling Request according to D-SR on PUCCH (e.g., if configured) and/or RA-SR on PRACH.

The WTRU may perform methods described herein, including eSR. Such signalling is shown at 6012 in FIG. 6/FIG. 10. The above may apply to the RRC-Inactive mode (e.g., if such a mode is supported by the WTRU).

For example, 6002 may be used for the WTRU's transmission of the first user plane data, perhaps for example if a second type of transmission may be used for the RSSC such that data may be included on the transmission for the RSSC.

The processes and instrumentalities described herein may apply in any combination, may apply to other wireless technologies, and for other services. Although features and elements are described herein in example combinations, one of ordinary skill in the art will appreciate that one or more, or each, feature or element can be used alone or in any combination with any of the other features and elements. The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU (UE), terminal, base station, RNC, and/or any host computer.

What is claimed is:

1. A method for communicating data performed by a wireless transmit/receive unit (WTRU), the method comprising:
   determining, by the WTRU, that at least one of: control plane data or user plane data is available for transmission to a network;
   determining, by the WTRU, that the WTRU is in at least one of: a radio resource control (RRC) IDLE mode or a RRC CONNECTED mode;
   determining, by the WTRU, that the WTRU is in an unsynchronized state relative to the network;
   determining a spectrum operational mode (SOM) for a transmission, the SOM indicating at least one of: a subcarrier spacing, a transmission time interval (TTI) length, or a waveform for the transmission;
   sending the transmission from the WTRU in the unsynchronized state, via a physical uplink channel to the network, the transmission including:
      the at least one of the control plane data or the user plane data; and
      an uplink timing synchronization request; and
   receiving, by the WTRU, at least one of a timing advance command (TAC) or a transmit power command (TPC) from the network in response to the transmission.

2. The method of claim 1, further comprising:
   receiving, by the WTRU, one or more parameters from the network for accessing a contention-based Physical Uplink Shared Channel (CB-PUSCH) in response to the transmission.

3. The method of claim 1, wherein one or more occasions of the physical uplink channel correspond to the SOM.

4. The method of claim 1, wherein one or more resources of the physical uplink channel correspond to the SOM.

5. The method of claim 1, further comprising:
   determining, autonomously by the WTRU, to send the transmission.

6. The method of claim 1, wherein the transmission does not indicate an identity of the WTRU.

7. The method of claim 1, wherein the physical uplink channel is a shared channel.

8. The method of claim 1, wherein the physical uplink channel is a Random Shared Synchronization Channel (RSSC).

9. The method of claim 1, wherein the transmission via the physical uplink channel reduces latency relative to at least one of: a random access channel (RACH) procedure, a radio resource control (RRC) connection establishment procedure, or a data packet scheduling.

10. The method of claim 1, wherein the control plane data includes as least one of an RRC Establishment Request, an RRC Re-establishment Request, or an RRC Connection Reactivation Request.

11. The method of claim 1, wherein the transmission is conducted using a filtered waveform that is characterized by relatively high spectral containment.

12. A wireless transmit/receive unit (WTRU), comprising:
   a processor, the processor configured at least to:
      determine that at least one of: control plane data or user plane data is available for transmission to a network;
      determine that the WTRU is in at least one of: a radio resource control (RRC) IDLE mode or a RRC CONNECTED mode;
      determine that the WTRU is in an unsynchronized state relative to the network; and
      determine a spectrum operational mode (SOM) for a transmission, the SOM indicating at least one of: a subcarrier spacing, a transmission time interval (TTI) length, or a waveform for the transmission;
   a transmitter, the transmitter configured at least to:
      send the transmission in the unsynchronized state, via a physical uplink channel to the network, the transmission including:
         the at least one of the control plane data or the user plane data; and
         an uplink timing synchronization request; and
   a receiver, the receiver configured at least to:
      receive at least one of a timing advance command (TAC) or a transmit power command (TPC) from the network in response to the transmission.

13. The WTRU of claim 12, wherein the processor is further configured to:
   receive one or more parameters from the network for accessing a contention-based Physical Uplink Shared Channel (CB-PUSCH) in response to the transmission.

14. The WTRU of claim 12, wherein the processor is further configured to:
   autonomously determine to send the transmission.

15. The WTRU of claim 12, wherein the transmission via the physical uplink channel reduces latency relative to at least one of: a random access channel (RACH) procedure, a radio resource control (RRC) connection establishment procedure, or a data packet scheduling.

16. The WTRU of claim 12, wherein the transmitter is further configured such that the transmission is conducted using a filtered waveform that is characterized by relatively high spectral containment.

* * * * *